US012686105B2

(12) United States Patent
Hurst et al.

(10) Patent No.: US 12,686,105 B2
(45) Date of Patent: Jul. 21, 2026

(54) CONNECTOR CLIP FOR DECK BOARDS

(71) Applicant: TREX COMPANY, INC., Winchester, VA (US)

(72) Inventors: Jacob Hurst, Winchester, VA (US); Darren Garrison, Capon Bridge, WV (US)

(73) Assignee: Trex Company, Inc., Winchester, VA (US)

( * ) Notice: Subject to any disclaimer, the term of this patent is extended or adjusted under 35 U.S.C. 154(b) by 640 days.

(21) Appl. No.: 18/173,400

(22) Filed: Feb. 23, 2023

(65) Prior Publication Data

US 2023/0264330 A1 Aug. 24, 2023

Related U.S. Application Data

(60) Provisional application No. 63/268,462, filed on Feb. 24, 2022.

(51) Int. Cl.
*B25B 31/00* (2006.01)
*E04F 21/22* (2006.01)
*E04F 15/02* (2006.01)

(52) U.S. Cl.
CPC .............. *B25B 31/00* (2013.01); *E04F 21/22* (2013.01); *E04F 15/02183* (2013.01)

(58) Field of Classification Search
CPC ....... B25B 31/00; B25B 21/002; B25B 5/068; E04F 21/22; E04F 15/02183; E04F 15/02044; E04F 2015/02094; B23Q 9/0078
USPC .......................................................... 254/15
See application file for complete search history.

(56) References Cited

U.S. PATENT DOCUMENTS 6,711,864 B2 3/2004 Erwin
6,736,303 B2 5/2004 Bruins et al.
6,997,659 B2 2/2006 Vrana et al.
7,052,200 B2 * 5/2006 Harris .................... F16B 5/002 403/231
7,090,451 B2 8/2006 Babej et al.
7,152,297 B2 12/2006 Ladouceur
7,237,996 B2 7/2007 Vrana
7,338,245 B2 3/2008 Ladouceur
(Continued)

FOREIGN PATENT DOCUMENTS

WO 202119542 A1 9/2021

*Primary Examiner* — Babajide A Demuren
(74) *Attorney, Agent, or Firm* — The Belles Group, P.C.

(57) ABSTRACT

In an exemplary embodiment, a fastener installation tool for installing hidden fasteners to a distal workpiece is provided. The fastener installation tool may include a housing containing an advancement mechanism for moving a plurality of hidden fasteners and a driving member that is engageable with a foremost fastener of the plurality of hidden fasteners to fasten the foremost hidden fastener to a structural member. The advancement mechanism may include at least a wheel, a carriage, and a linkage member. The linkage member may be connected to the driving member and the carriage such that when the driving member moves towards the foremost hidden fastener, the carriage rotates in a first direction, and when the driving member moves away from the foremost hidden fastener, the carriage rotates in a second direction, opposite the first direction, and further causes the wheel to rotate and move a subsequent hidden fastener into position for fastening.

13 Claims, 16 Drawing Sheets

(56) References Cited

U.S. PATENT DOCUMENTS

| | | | |
|---|---|---|---|
| 7,387,575 B2 | 6/2008 | Babej | |
| 7,427,180 B2 | 9/2008 | Ladoucer | |
| 7,704,151 B2 | 4/2010 | Vrana | |
| 8,200,616 B2 | 6/2012 | Boldyrev et al. | |
| 8,517,238 B2 | 8/2013 | Gensmann | |
| 8,555,570 B2 | 10/2013 | Martel | |
| 8,672,204 B2 | 3/2014 | Vandenberg | |
| 8,925,644 B2 | 1/2015 | Vandenberg | |
| 8,955,210 B2 | 2/2015 | Vandenberg | |
| 9,120,214 B2 | 9/2015 | Vandenberg | |
| 9,144,896 B2 | 9/2015 | Vandenberg | |
| 9,360,036 B2 | 6/2016 | Waterman et al. | |
| 9,452,514 B2 | 9/2016 | Guthrie et al. | |
| 9,682,465 B2 | 6/2017 | Lan et al. | |
| 9,751,197 B2 | 9/2017 | Vandenberg | |
| 9,784,296 B2 | 10/2017 | Vandenberg | |
| 9,802,300 B2 | 10/2017 | Vandenberg | |
| 9,822,809 B2 | 11/2017 | Shadwell et al. | |
| 9,969,068 B2 | 5/2018 | Walters et al. | |
| 10,018,215 B2 | 7/2018 | Walters | |
| 10,124,470 B2 | 11/2018 | Dicaire | |
| 10,214,896 B2 | 2/2019 | Tebo | |
| 10,220,497 B2 | 3/2019 | Vandenberg | |
| 10,286,458 B2 | 5/2019 | Brigham | |
| D850,898 S | 6/2019 | Vandenberg | |
| 10,315,295 B2 | 6/2019 | Vandenberg | |
| 10,406,659 B2 | 9/2019 | Dicaire et al. | |
| 10,407,898 B2 | 9/2019 | Tebo | |
| 10,414,030 B2 | 9/2019 | Vandenberg | |
| 10,421,176 B2 | 9/2019 | Vandenberg | |
| 10,494,821 B2 | 12/2019 | Shadwell et al. | |
| 10,537,942 B2 | 1/2020 | Brigham | |
| 10,569,397 B2 | 2/2020 | Arai et al. | |
| 10,603,768 B2 | 3/2020 | Irwin et al. | |
| 10,605,288 B2 | 3/2020 | Martel et al. | |
| 10,688,642 B2 | 6/2020 | Shadwell | |
| 10,859,109 B2 | 12/2020 | Walters et al. | |
| 10,920,432 B2 | 2/2021 | Demuth et al. | |
| D924,044 S | 7/2021 | Vandenberg | |
| 11,149,445 B2 * | 10/2021 | Vandenberg | E04F 21/1877 |
| 11,840,848 B2 * | 12/2023 | Vandenberg | E04F 15/02022 |
| 11,873,648 B2 * | 1/2024 | Carlson | E04B 1/388 |
| 11,898,357 B2 * | 2/2024 | Vandenberg | E04F 15/02044 |
| D1,022,684 S * | 4/2024 | Schwartzkopf | D8/382 |
| 2004/0234356 A1 | 11/2004 | Parker et al. | |
| 2005/0097733 A1 | 5/2005 | Gasser et al. | |
| 2005/0210651 A1 | 9/2005 | Vrana et al. | |
| 2006/0059822 A1 | 3/2006 | Guffey | |
| 2012/0000327 A1 * | 1/2012 | Park | B25B 23/045<br>81/434 |
| 2013/0104494 A1 | 5/2013 | Evangelista et al. | |
| 2014/0021236 A1 * | 1/2014 | Martel | F16B 15/02<br>227/18 |
| 2017/0190030 A1 | 7/2017 | Schmidt | |
| 2018/0010627 A1 * | 1/2018 | Shadwell | F16B 43/025 |
| 2018/0141134 A1 | 5/2018 | Brigham | |
| 2018/0223547 A1 * | 8/2018 | Demuth | B25C 7/00 |
| 2018/0223893 A1 | 8/2018 | Walters et al. | |
| 2019/0071880 A1 | 3/2019 | Demuth et al. | |
| 2019/0126446 A1 | 5/2019 | Irwin et al. | |
| 2019/0291248 A1 | 9/2019 | Vandenberg | |
| 2020/0147765 A1 | 5/2020 | Irwin et al. | |
| 2020/0340252 A1 * | 10/2020 | Carlson | E04B 5/02 |
| 2021/0197352 A1 | 7/2021 | Ueda | |
| 2021/0301543 A1 | 9/2021 | Carlson et al. | |

* cited by examiner

CONNECTOR CLIP FOR DECK BOARDS

TECHNICAL FIELD

The present disclosure relates to a fastener installation tool and fastener system. More specifically, the present disclosure is directed to a fastener installation tool for installing a hidden fastener to secure boards.

BACKGROUND

Outdoor structures, such as decks, are becoming popular as living space expands beyond the interior of the home. Typically, individual boards are used to create a horizontal walking surface using fasteners, such as nails or screws to fasten the boards to a structural member (e.g., joists, headers, posts) or to an adjacent board. However, these fasteners provide several shortcomings, such as structural integrity, difficulty and discomfort of use, and various aesthetic limitations. For example, nails or screws are employed on a (top) surface of the board to fasten the boards to the structural member. Due to harsh environmental factors such as moisture and UV exposure, the voids in the boards created by installing nails or screws, as well as the nails and screws themselves are subject to degradation (i.e., rusting), thus causing the boards to crack or split and compromise the structural integrity and aesthetic appearance of the decking assembly. This in turn weakens the fastening function of the nails and screws. Additionally, the rusting effect may cause discoloration to a portion (i.e., top surface) of the boards and produce an unattractive, worn appearance to the deck. Additionally, using conventional nails or screws, during fastening, largely requires a person to operate tools (e.g., a hammer, a screwdriver, a drill, power tools, etc.) at close proximity to the boards, causing potential for repetitive motion injury to the person as well as direct injury from the use of such tools.

As an alternative to nails and screws, hidden fasteners (e.g., connector clips) have been used for deck assembling and are gaining popularity among builders and homeowners. These hidden fasteners produce a more finished appearance as no visible nails or screws (or screw holes) are visible after installation. Such hidden fasteners typically anchor a board to the substructure, coupling the boards to each other and to the frame below. This in turn hides the nails and screws from view and reduces cracking or splitting of the boards, which also poses the risk of possible cuts or splinters to users. However, these hidden fasteners can be difficult to install and time consuming as it frequently requires a multi-step process and additional equipment. For example, one must first align and install the hidden fastener assembly to each of the joists running perpendicular to the boards using a fastener (e.g., nail or screw). As compared to joining the fasteners directly to the boards and the joists simultaneously, a multi-step installation process takes a longer time for assembly. Additionally, one must use additional tools (e.g., rubber hammer, clamps, guides, board straighteners, etc.) to make sure the adjacent boards are properly aligned to each other. Another multi-step approach to installing the hidden fasteners has been using a driver extension to drive the fasteners through a hidden fastener assembly and into the joist. However, in this approach, prior to driving, one must first individually insert the fasteners into a corresponding groove on the side of a board and then drive the fasteners using the driver extension. This in turn creates additional time to install (i.e., drive) the hidden fasteners and boards onto the substructure. Additionally, this approach requires a force to make sure that the board is tightly secure to the adjacent board prior to driving the fastener into the substructure. For example, prior to driving, a second person applies a (lateral) force against the adjacent board by holding the to-be installed board or applying pressure against an adjacent board so that the boards are tightly connected and creates a consistent gap between the boards before driving the screw into the hidden fasteners. This approach in turn requires that at least a second person or device must be present to assemble a deck.

In view of the problems associated with these alternative approaches for deck assembly, there remains a need to provide a fastener installation tool that permits hidden fasteners for use in conjunction with boards to be installed from a standing position and for the fasteners for use with the fastener installation tool.

SUMMARY

In an exemplary embodiment, a fastener installation tool for installing hidden fasteners from a standing position is provided. The fastener installation tool may include a housing containing an advancement mechanism for advancing a plurality of connector clips, and a driving member that is engageable with a foremost fastener of the plurality of connector clips to fasten the foremost connector clip to a structural member. The advancement mechanism may include at least a wheel, a carriage, and a linkage member. The linkage member may be connected to the driving member and the carriage such that when the driving member moves towards the foremost hidden fastener, the carriage rotates in a first direction, and when the driving member moves away from the foremost hidden fastener, the carriage rotates in a second direction, opposite the first direction, and further causes the wheel to rotate and move a subsequent hidden fastener into position for fastening.

In another exemplary embodiment, a fastener installation tool for installing hidden fasteners to a distal workpiece is provided. The fastener installation tool may include a housing to contain an advancement mechanism, a fastener track member to store a plurality of connector clips, a drive shaft housing member including a drive shaft to engage the plurality of connector clips positioned in the housing, and a pedal assembly configured to be moveable in a first pedal position and a second pedal position. The pedal assembly includes a translating member for engaging the hidden fastener. In the first pedal position, the translating member can be in a first position, and in the second pedal position, the translating member can be in a second position that is different than the first position.

In another exemplary embodiment, a fastener for attaching a decking member to a support member is provided. The fastener includes a body including a top surface with a generally flat portion defining a plane extending between two opposing shoulder portions. The top surface includes an opening to permit a fastener to extend therethrough and fasten to the support member. The flat portion is designed to cooperatively engage with a guide portion formed in a fastener track member of an installation tool.

In another exemplary embodiment, a method of installing a hidden fastener to a workpiece is provided. The method may include positioning an installation tool having a pedal assembly to a structural member that supports the workpiece, depressing the pedal assembly such that the installation tool moves towards the workpiece, installing the hidden fastener to the structural member at an installation site, and releasing the pedal assembly to remove the installation tool away from the structural member.

Other features and advantages of the present invention will be apparent from the following more detailed description of the preferred embodiment which illustrates, by way of example, the principles of the invention.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION

A fastener installation tool, according to the present disclosure, is an apparatus that permits hidden fasteners, e.g., connector clips for use in conjunction with (deck) boards, to be installed from a standing position, and for the hidden fasteners designed for use with the fastener installation tool. This allows for faster installation of the boards and/or prevents possible fatigue or bodily injury (e.g., back injury, eye injury, hand/finger injury). With conventional tools, an operator uses a tool (e.g., a hammer, a screwdriver, a power drill) in close proximity to both the board's surface and the operator extremities while joining a hidden fastener to the boards and/or structural members, causing possible injuries to the user. The fastener installation tool is operated by a single user requiring no additional operators. With conventional installation tools, a second operator or tool is often required to apply a force (or pressure) to hold the boards together prior to the fastening procedure. The fastener installation tool is lightweight and capable of being carried easily to job-sites to aid in the installation of boards and/or easily stored. The fastener installation tool provides accurate lateral alignment for placing the hidden fasteners to a structural member (e.g., joist) as well as preventing an overdriven fastener from blocking the next course of boards from being installed under the adjacent wing of the fastener assembly.

As described herein, the term "connector clip" is interchangeable with and/or described as a "hidden fastener" that is configured to fasten adjacent to or under the boards, which in effect hides the connector clip from plain sight while constraining the movement of (adjacent) boards. The term "fastener assembly" described herein includes the connector clip (or hidden fastener) and a fastener (e.g., screw) assembled together.

Figure 1:
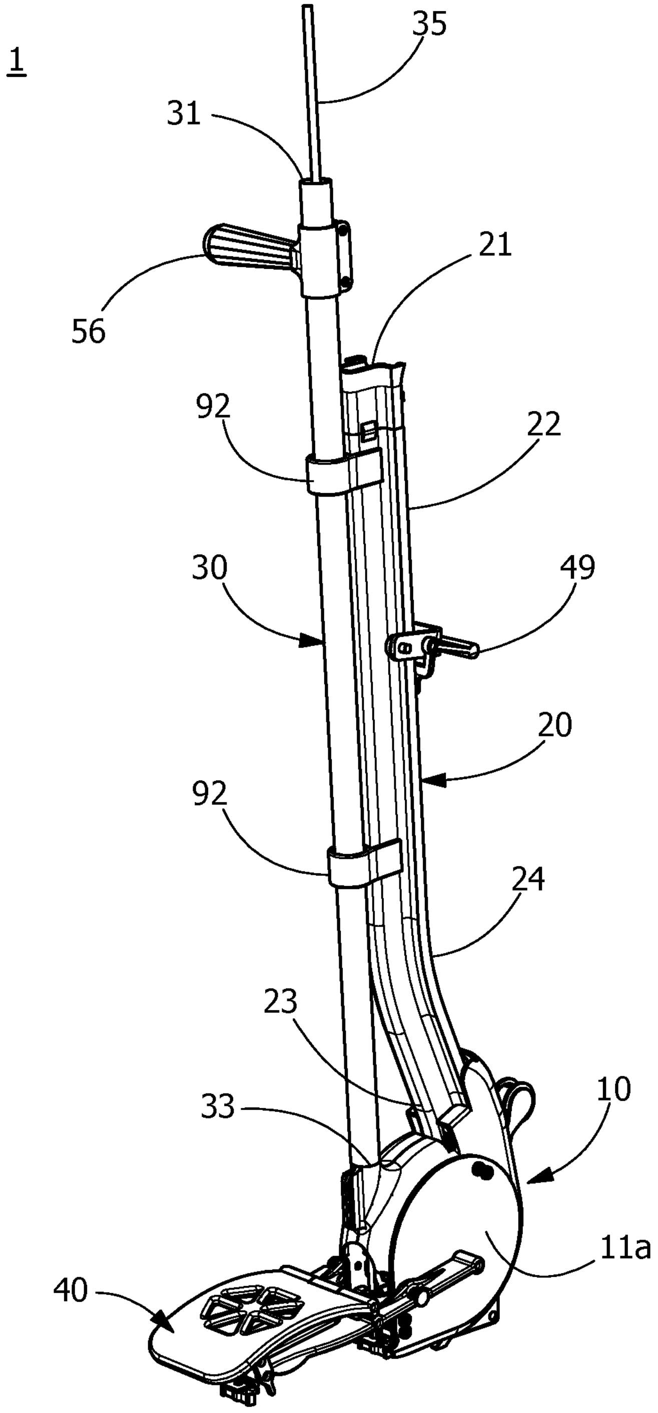
FIG. 1 is a schematic view of a fastener installation tool, according to an example embodiment of the present disclosure.
Figure 11A:
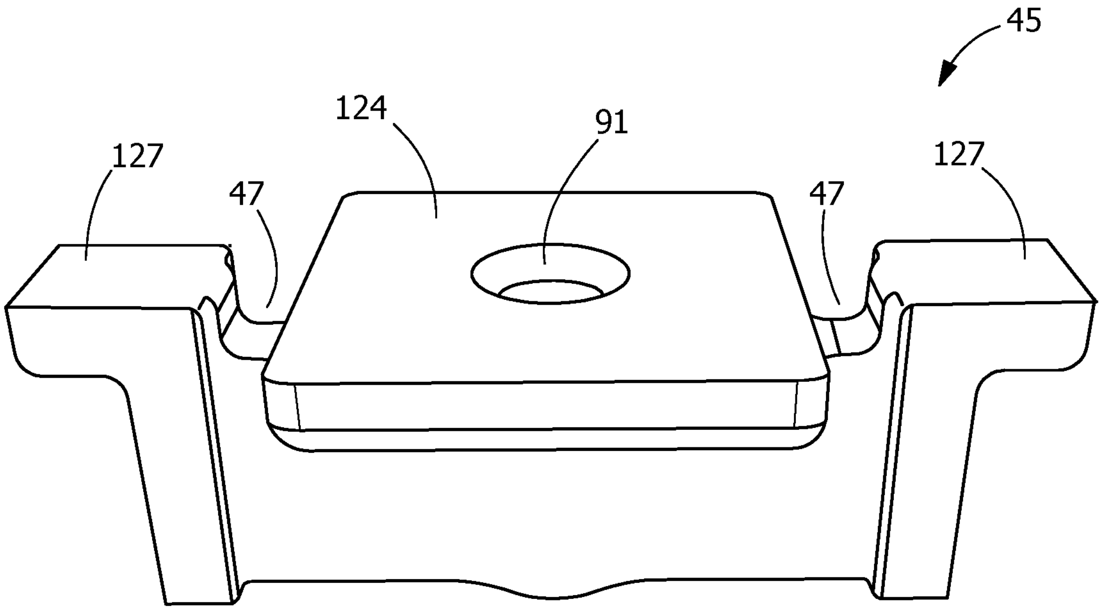
FIG. 11A is a schematic view of a connector clip, according to an example embodiment of the present disclosure.

FIG. 1 is a perspective view of a fastener installation tool 1 according to an example embodiment. The fastener installation tool 1 includes a housing member 10 that contains an advancement mechanism 15 to move (advance) connector clips 45 (as shown in FIG. 11A), a fastener track member 20 for storing the connector clips 4 within the installation tool 1, a drive shaft housing member 30 to engage the connector clips 45 contained in the housing member 10, and a seating pedal member 40 that draws the installation tool 1 into position for installation.

Each of the housing member 10, the fastener track member 20, the drive shaft housing member 30, and the seating pedal member 40 can be constructed from plastic materials or polymers, such as, but not limited to, polyethylene terephthalate (PET), high density polyethylene (HDPE), low density polyethylene (LDPE), polypropylene (PP), and/or polyvinyl chloride (PVC). Due to the inherent and mechanical properties of plastic (e.g., density, toughness, low electrical conductivity, transparency, etc.), the fastener installation tool 1 can be light weight and durable to withstand external force (e.g., impact, drops, stress, and the like) applied to the fastener installation tool 1. In other implementations, the housing member 10, the fastener track member 20, the drive shaft housing member 30, and the seating pedal member 40 can be made from other materials, such as, metal (e g., aluminum) In other implementations, the housing member 10, the fastener track member 20, the drive shaft housing member 30, and the seating pedal member 40 can be made from a combination of plastic and metal, and/or a metal polymer composite.

Figure 2:
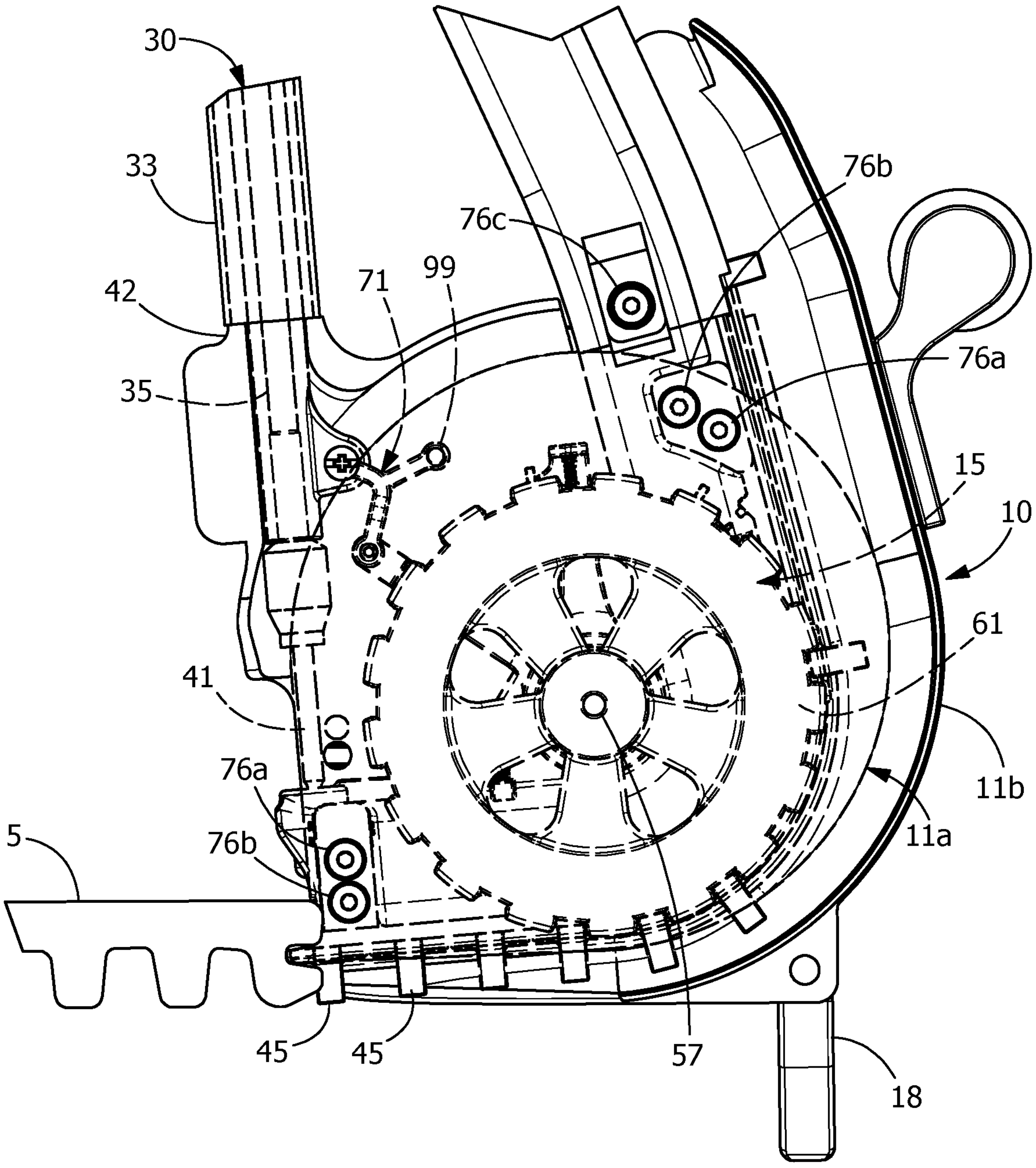
FIG. 2 is a schematic view of a housing member containing an advancing mechanism, according to an example embodiment of the present disclosure.
Figure 4:
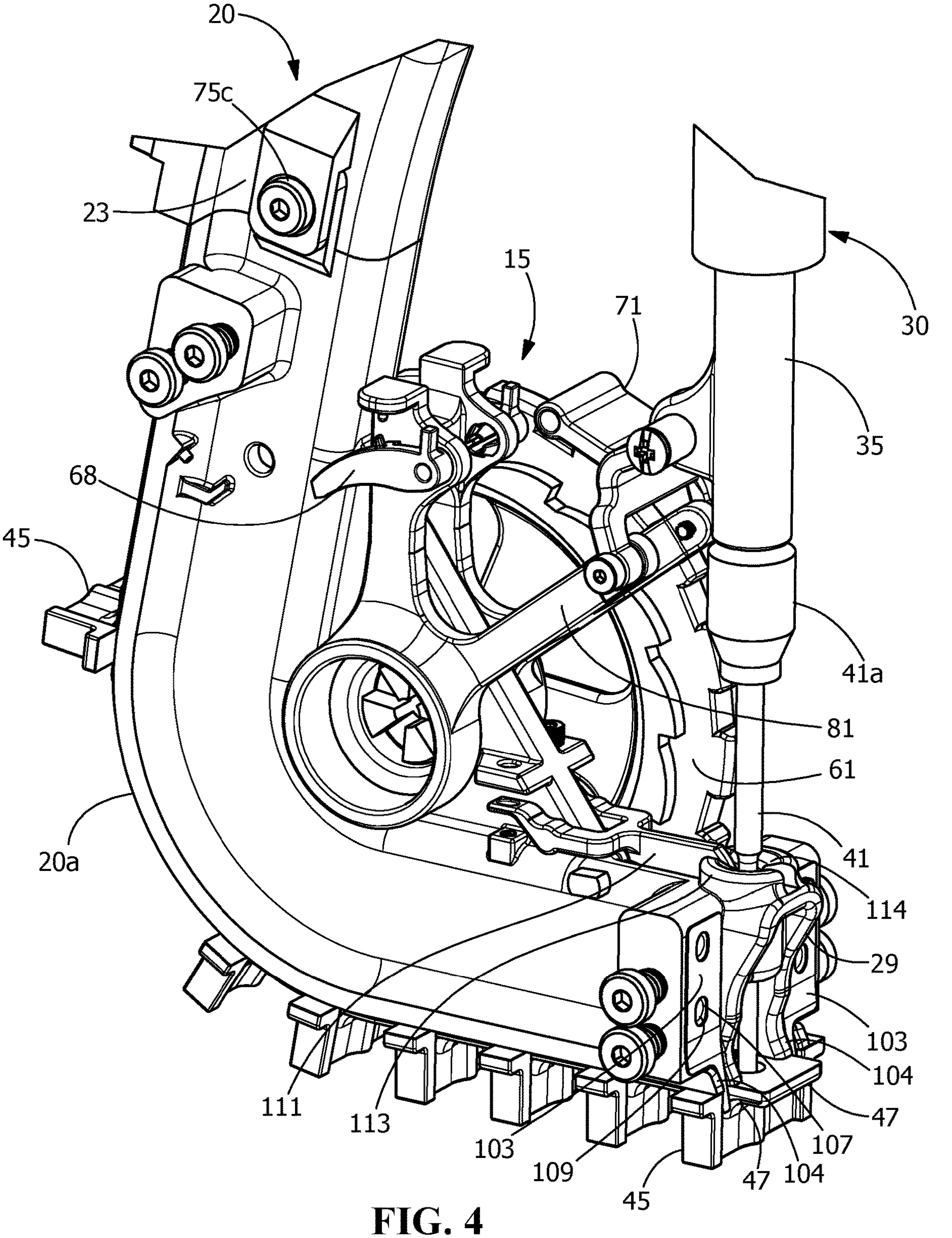
FIG. 4 is a schematic view of an inner fastener track member, according to an example embodiment of the present disclosure.

Referring FIG. 2, the housing member 10 houses the advancement mechanism 15 comprising, at least, a wheel 61, a linkage mechanism 71, and an advancement carriage 81 (as shown in FIG. 4); which will be described in detail later. Due to the shape of the wheel 61, the housing member 10 is substantially circular in shape. Other shapes may be employed as long as the housing member 10 contains components of the advancement mechanism 15. The housing member 10 includes a -first housing cover and a second housing cover 11*b* to cover and protect the housing member 10 including a mounting structure for the advancement mechanism 15 inside of the housing member 10. The first housing cover 11*a* and the second housing cover 11*b* correspondingly engage with each other to form the housing member 10. For illustrative purpose, FIG. 2 depicts the housing cover 11*a* as slightly transparent to illustrate the components inside of the housing member 10. In most cases, the housing cover Ha is a solid member that is opaque. For example, the housing cover 11*a* can he made from a plastic material. In some implementations, the housing covers 11*a*, 11*b* are attached to the housing member 10 by fasteners 76*a*, 76*b*, such as, but not limited to, nuts and bolts, anchors, rivets, and others. In some implementations, the fasteners 76*a*, 76*b* can be the same type or the fasteners 76*a*, 76*b* can be different from each other for added securement. For example, a first fastener type can be a hex nut screw and a second fastener type can be an internal hex screw. In some implementations, the housing covers 11*a*, 11*b* can be a unitary construction with the housing member 10. In some implementations, in addition to attachment with the housing covers 11*a*, 11*b*, fasteners 76*a*, 76*b* can be used to attach the fastener track member 20 to the housing member 10 concurrently.

Figure 3:
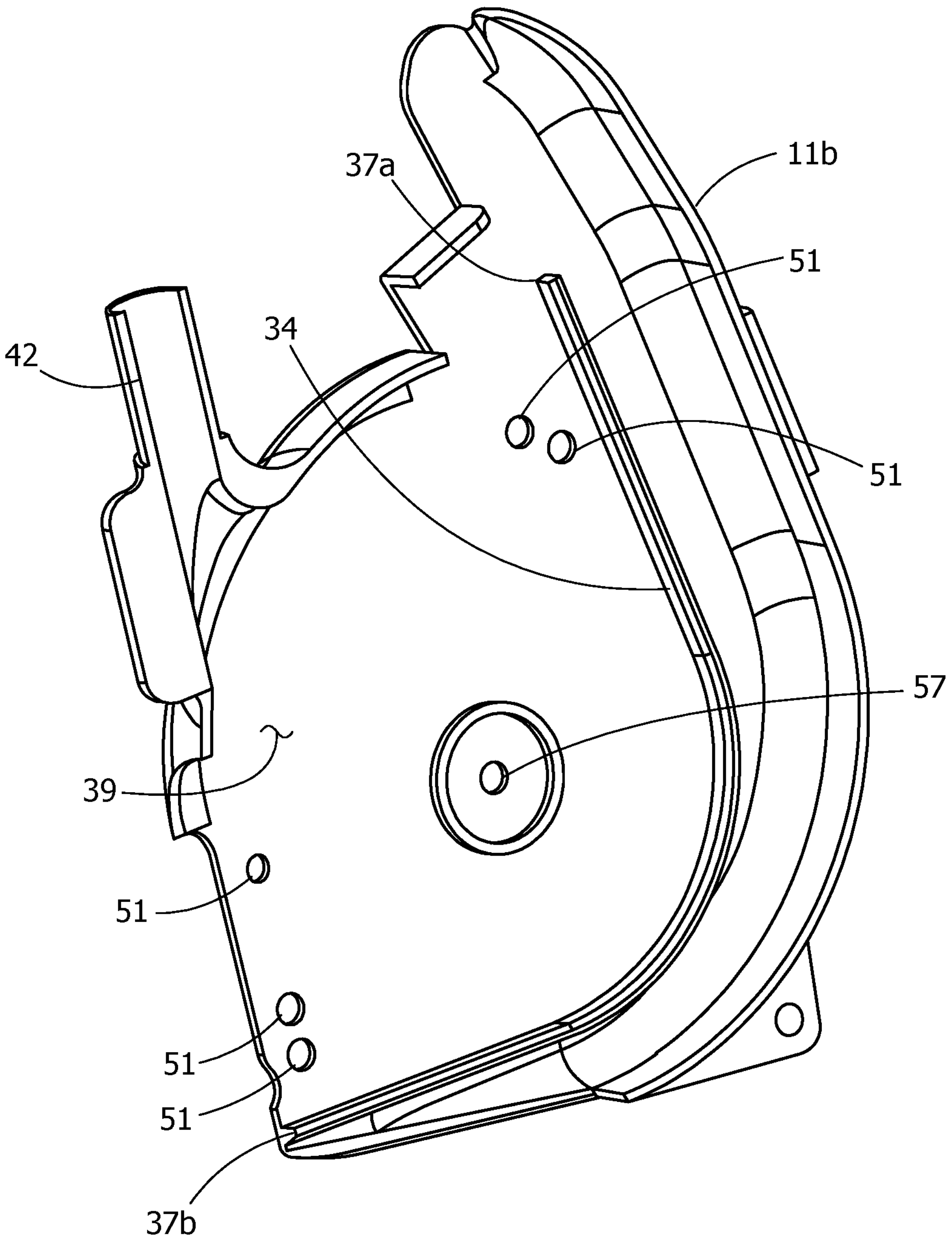
FIG. 3 is a schematic view of an inner surface of a housing cover, according to an example embodiment of the present disclosure.

As shown in FIG. 3, the second housing cover 11*b* includes a raised portion 34 on an inner surface 39 of the second housing cover 11*b*. The raised portion 34 is located substantially near an edge of inner surface 39 of the second housing cover 11*b*, having a substantially "L"-like shape. In the embodiment shown in FIG. 3, the raised portion 34 has a substantially inversed "L"-like structure. In one implementation, a first end 37*a* of the raised portion 34 begins near a section of the second housing cover 11*b* that is connected to the fastener track member 20 and a second end 37*b* of the raised portion 34 ends near an opening of the housing member 10 at an installation site of the fasteners. The raised portion 34 can act as a rail for the connector clips 45 to slide thereon once the connector clips 45 enter the inside of the housing member 10 from the fastener track member 20. In other words, the raised portion 34 provides a track for the connector clips 45 in the housing member 10. The raised portion 34 also stabilizes the connector clips 45 inside of the housing member 10 and prevents the connector clips 45 from moving in the housing member 10. The second housing cover 11*b* includes openings 51 for receiving and inserting the fasteners 76*a*, 76*b* to the housing member 10. it should be appreciated that the first housing cover 11*a* also includes openings 51 to correspondingly attach the first and second housing covers 11*a*, 11*b* together via the fasteners 76*a*, 76*b*. The housing member 10 further includes an opening 57 at a center of the first and second housing covers 11*a*, 11*b* for receiving a portion of the pedal member 40. In other words, one end of pedal member 40 is inserted into the opening 57 to engage at least the wheel 61 housed in the housing member 10. It should be appreciated that the opening 57, the wheel 61, and the advancement carriage 81 are co-axially aligned so that the pedal member 40 can rotate at a fixed point.

Referring back to FIG. 1, the fastener track member 20 includes a proximal end 21 and a distal end 23. The fastener track member 20 is an elongated hollow shaft configured to contain connector clips 45 and advance the connector clips 45 when operated. The fastener track member 20 can be of a length sufficient to enable an operator to use the installation tool 1 in a standing upright position, while applying the connector clips 45 to a distal workpiece (i.e., a deckboard) that optionally can be at floor level, or above or in front of the operator.

The fastener track member 20 includes a first portion 22 and a second portion 24. The first portion 22 is constructed such that this portion is substantially linear and the second portion 24 is constructed such that this portion is non-linear (i.e., angled) with respect to the drive shaft housing member 30. The non-linear second portion 24 ensures that the connector clips 45 stay on the fastening track member 20 when entering the housing member 10, which will be described later in detail. The distal end 23 of the fastening track member 20 is attached to the housing member 10. In one implementation, the fastener track member 20 is attached to the housing member 10 by a fastener 76*c* (as shown in FIG, 2). Other fasteners may be employed such as, but not limited to, nuts and bolts, anchors, rivets, and others. in some implementations, the fastener track member 20 can be a unitary construction with the housing member 10.

Referring to FIG. 4, the fastener track member 20 includes an inner fastener track member 20*a* that extends into and within the housing member 10. The inner fastener track member 20*a* is merely an extension of the fastener track member 20 that is arranged inside of the housing member 10, and where the connector clips 45 can slide thereon. In one implementation, the inner fastener track member 20*a* is attached to the fastener track member 20 (i.e., distal end 23) via the fastener 76*c*. In other implementations, the inner fastener track member 20*a* can be unitary formed with the fastener track member 20 as a single unit. In one implementation, the inner fastener track member 20*a* has a substantially "L"-like shape. In one implementation, the inner fastener track member 20*a* has similar shape as the raised potion 34 of the housing cover 11*b*. As such, a side portion of the inner fastener track member 20*a* can abut against the raised portion 34 of the housing cover 11*b*. This permits the connector clips 45 to smoothly slide within the housing member 10 and provide a pathway for movement of the connector clips 45 in the housing member 10.

Figure 5A:
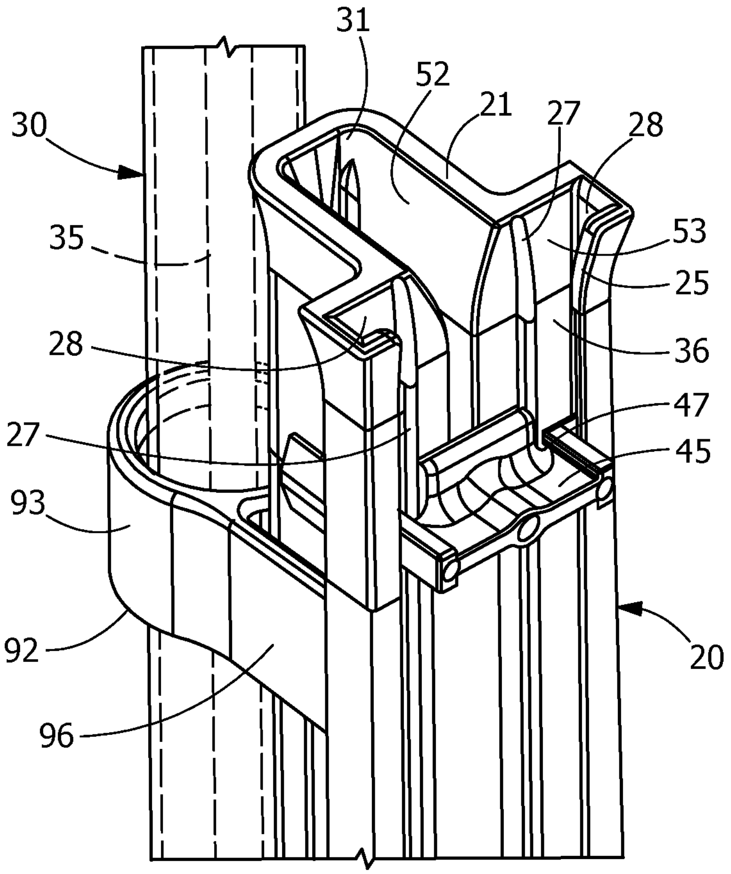
FIGS. 5A and 5B are partial schematic views of a fastener track member, according to an example embodiment of the present disclosure.
Figure 5B:
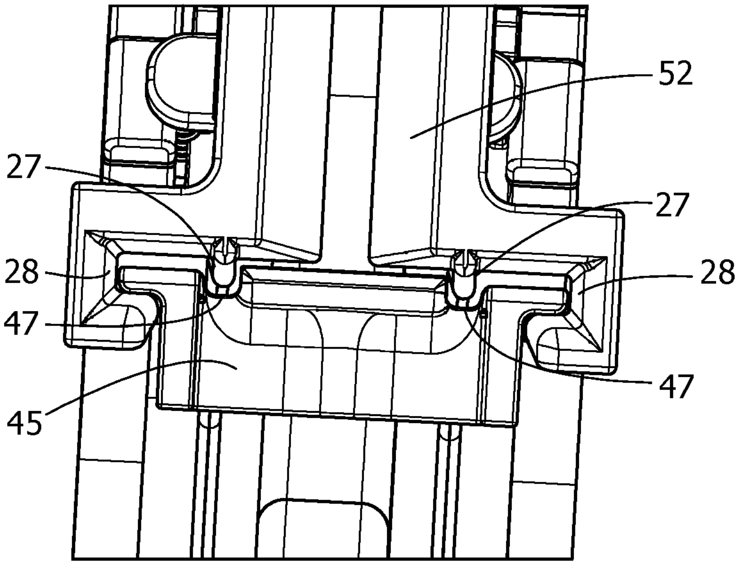

Referring to FIGS. 5A and 5B, the fastener track member 20 includes an opening at the proximal end 21 to receive and insert a fastener assembly. As described herein, the tem) "fastener assembly" encompasses an assembled connector clip 45 and fastener 41 (e.g., an elongated screw). The fastener track member 20 includes a track 25 for receiving and slidably engaging with the fastener assembly, more specifically, the connector clips 45. The connector clips 45 are inserted at the proximal end 21 of the fastener track member 20 and configured to slide along the track 25. In some implementations, the fastener track member 20 includes a first track portion 52 (e.g., a hollow bore) for containing the fastener 41 (i.e., screw) and a second track portion 53 for containing the connector dip 45. As such, the fastener track member 20 forms substantially a T-like shape, in Which the first track portion 53 contains the elongated screw 41 and the second track portion 52 contains the connector dip 45 when assembled together. Other shapes may be employed as long as the elongated screw 41 and the connector dip 45 correspond (slidably engage) within the fastener track member 20, in one implementation, the elongated screw 41 can be a 1 ⅝ inch stainless steel deck screw. Other sizes of elongated screws 41 may be employed contingent upon the desired depth of insertion into the structural member, e.g., joist.

It should be appreciated that the screw 41 is pre-assembled with the connector clip 45 prior to engaging the fastener track member 20. forming the fastener assembly. In other words, the screw 41 is already pre-staged in the connector clip 45 when inserting the connector clip 45 in the fastener track member 20.

The track 25 includes a pair of guide rails 27 and a pair of guide grooves 28. The guide rails 27 are formed on a surface 36 of the track 25 and laterally spaced apart from one another and extends in a direction generally parallel to a longitudinal axis of the fastener track member 20. The guide rails 27 are formed to receive and slidably engage with corresponding grooves 47 formed on the connector clip 45. The guide rails 27 ensure that the connector clips 45 are properly aligned (and stays) in the track 25 (luting operation of the installation tool 1. Further, the guide rails 27 help facilitate an initial insertion of the connector clips 45 for precise alignment onto the track 25. The guide grooves 28 extend generally parallel to the guide rails 27 and are vertically spaced apart therefrom. The guide grooves 28 are adapted to receive a shoulder portion 127 (as shown in FIG. 11A) of the connector clip 45, formed on both sides of the connector clip 45. The guide grooves 28 ensure that the connector clips 45 are slidably engaged to the track 25, and further prevents rotational and/or vertical movements within the fastener track member 20.

In operation, once the connector clip 45 is inserted into the track member 20, the connector clip 45 slides along the track 25 through the first portion 22 of the track member 20, having a substantially straight track (i.e., substantially parallel to a longitudinal direction of the installation tool 1), and then through the second portion 24 of the track member 20. The second portion 24 is at an angle with respect to the first portion 22. The angled position of the second portion 24 facilitates that the connector clips 45 enter the advancement mechanism 15 in the housing member 10 at a proper alignment (i.e., prevents misalignment). in other words, due to the curvature design of the advancement mechanism 15 in the housing member 10, the angled positioned second portion 24 facilitates with the transition of the connector clips 45 of entering the housing member 10.

In some implementations, the fastener track member 20 includes a biasing member (not shown) to retain the fasteners 45 within the track 25. The biasing member is constructed and operated as a device to a provide a force toward the advancement mechanism 15 in the housing member 10. For example, the biasing member can he a tension spring, a coil spring, a spool, a windup mechanism., or some other mechanism configured to forcibly apply translational force to the connector clips 45. As such, the connector clips 45 are thereby captive in the fastener track 25 until dispensed. In some implementations, a release mechanism 49 (as shown in FIG. 1) is provided such that it can release the biasing member to remove the connector clips 45 from the fastener track member 20. The release mechanism 49 can be located externally of the fastener track member 20. which can be easily grabbed by the user. The release mechanism 49 can be attached to a carriage (not shown) attached to the biasing member, whereby the carriage travels up and down the fastener track 25.

The drive shaft housing member 30 includes a proximal end 31 and a distal end 33. The drive shaft housing member 30 is an elongated hollow shaft configured to contain a drive shaft 35. In one implementation, the drive shaft housing member 30 is a circular elongated hollow tube. The drive shaft housing member 30 can he of a length sufficient to enable an operator to use the installation tool 1 in a standing upright position, while applying the connector clips 45 to a distal board 5 that optionally can be at floor level, or above, or in front of the operator. The drive shaft housing member 30, at the distal end 33, is attached to the housing member 10. In one implementation, the drive shaft housing member 30 is pressure fitted with a corresponding tubular member 42 formed in the housing member 10 for a tight fit, as shown in FIG. 2. in other words, the tubular member of the drive shaft housing member 30, having a larger diameter, fits over the corresponding tubular member 42, having a smaller diameter, in the housing member 10. To describe in a different manner, the connection between the drive shaft housing member 30 and the tubular member 42 of the housing member 10 has a female-to-male tubular fitting connection. In some implementations, a surface of the tubular members of the drive shaft housing member 30 and the housing member 10 can be threaded for secure fitting. In some implementations, adhesive may be applied on a surface of the drive shaft housing member 30 and/or the tubular member 42 to securely fit the drive shaft housing member 30 and the tubular member 42 together. In other implementations, the drive shaft housing member 30 is attached to the housing member 10 by a fastener (e.g., a screw). Other fasteners may be employed such as, but not limited to, hex nut screws, nuts and bolts, anchors, rivets, and others.

At the proximal end 31 of the drive shaft housing member 30, the shaft drive 35 extends out of the proximal end 31 thereof for connection to a power tool (not shown), for example, a cordless power drill. In some implementations, an end of the drive shaft 35 (extending out of the drive shaft housing member 30) that is connected to the power tool can contain a joint assembly (not shown) for joining the power tool to the drive shaft 35. For example, the joint assembly may include a fitting connector (e.g., a drill chuck) that connects the power tool to the drive shaft 35. This in turn, via operation of the power tool, controls the shaft drive 35 to ascend or descend. towards the screw 41 located in the housing member 10 due to the vertical configuration of the drive shaft housing member 30. In some implementations, the fitting connector may include threaded and locking members to lock the power tool to the drive shaft 35. This ensures that a tight connection is made between the power tool and the drive shaft 35.

Near the proximal end 31 of the drive shaft housing member 30, a handle 56 (as shown in FIG. 1) is provided to permit the operator to lift and/or carry the installation tool 1 for operation. For example, the operator grabs the handle 56 and aligns the installation tool 1 against a joist, and applies a force to the handle for stability -while operating the powered driver to fasten the connector clips 45. In other utility, the handle 56 can he used to counteract torque applied by the powered driver. Once the connector dip 45 is completely fastened to the joist, the operator then lifts the installation tool 1, via the handle 56, and places the installation tool 1 onto the next joist for fastening the next connector clip 45.

Referring back to FIG. 4, at a distal end of the drive shaft 35, a fitting 38 is provided to engage the screw 41 and insert (e.g., drill) the screw 41 into the connector clip 45. For example, at a first position (initial position), when a foremost connector clip 45 is in a position in the housing member 10 to be fastened, the fitting 38 of the drive screw 35 is positioned above the screw 41 to he engaged. When the drive shaft 35 begins to rotate, via operation of the power tool, in a clockwise direction, the drive shaft 35 begins to descend towards the screw 41 and engages the screw 41 so as to fasten the connector clip 45 into the structural member, e.g., joist. When the screw 41 is completely fastened (inserted into) to the connector clip 45, the drive shaft 35 rotates, via the opposite operation of the power tool, in a counter-clockwise direction to ascend the drive shaft 35 away from the screw 41. This step is repeated until the next connector clip 45 holding the screw 41 is required for fastening.

For proper engagement, an end of the fitting 38 engages to a head 41*a* of the screw 41 to drive the screw 41. into the structural member. That is, the end of the fitting 38 correspondingly matches the shape (or groove(s)) of the head 41*a* of the screw 41. The fitting 38 can be of various types of drivers to drive the screw 41. For example, the fitting 38 can be a slot screw driver; a coin-slot driver, a hi-torque driver, a cross driver, a square driver, a multi-square driver, an internal hex driver, an external driver and/or a combination driver.

In some implementations, a receiving portion 113 is located near an end 29 of inner fastener track member 20*a* for receiving the fastener 41 in position at an installation site. The receiving portion 113 ensures that the fastener 41 is in proper position. That is, if the fastener 41 is not properly aligned, the fastener 41 will not properly fit in the receiving portion 113 indicating that there is a misalignment. In one implementation, the receiving portion 113 has a depressed region 114 for receiving the fastener 41. For instance, the depressed region 114 can be cup-shaped, i.e., concave-like shape. In order to further ensure proper alignment, a stabilizing arm 111 engages a portion of the receiving portion 113. More specifically, the stabilizing arm 111 engages a top portion of the depressed region 114 to hold the receiving portion 113 in place. The stabilizing arm 111 is attached to the inner fastener track member 20*a* via a retention spring 119 (shown in FIGS. 6A and 6B). Due to the retention spring 119, the stabilizing arm 111 can exert a slight downward force on the receiving portion 113.

In some implementations, a retention member 103 is located at the end 29 of inner fastener track member 20*a* for holding the connector clip 45 in position at the installation site prior to fastening the connector dip 45. That is, the retention member 103 is a member that exerts a biasing force to prevent advancement of the connector clips 45 from moving forward. To describe in a different manner, a biasing force that is opposite in direction of the path of the connector clips 45. In one implementation, the retention member 103 is a flat, elastic deformable member, made from, such as, for example, plastic and/or metal. In one implementation, the retention member 103 includes an opening 107 for receiving a fastener 109 (i.e., a bolt) to attach the retention member 103 to the inner fastener track member 20*a*. It is appreciated that only an end portion of fastener 109 is shown in FIG. 4 because the fastener 109 is positioned inside of the inner fastener track member 20*a*. Other fastening means, such as, for example, a screw, a rivet, an anchor, a weld, etc., may be employed for attachment. In some implementations, there are two openings 107 for each retention member 103. One skilled in the art would appreciate that there may be more or less than two openings 107 to attach the retention member 103 to the inner fastener track member 20*a*. In some implementations, there are two retention members 103, one on each side of the inner fastener track member 20*a*.

Further, the retention member 103 includes an extended portion 104 for maintaining the connector dip 45 in place. This creates a biasing force and/or tension to maintain the connector clip 45 from advancing. In one implementation, the extended portion 104 extends below a bottom portion of the retention member 103. The extended portion 104 engages the pair of grooves 47 formed on the connector clip 45. As such, as shown in FIG. 4, two extended portions 104 are shown, one for each respective retention member 103 which corresponds to the respective grooves 47. The extended portion 104 of the retention member 103 reinforces the connector dip 45 from movements (i.e., linearly and/or vertically). It should be appreciated that the retention member 103 can be other types, such as, but not limited to, a coil spring, a tension spring, a spool, a windup mechanism, or some other mechanism configured to provide a biasing force and/or tension to maintain the connector dip 45 in place.

Figure 6A:
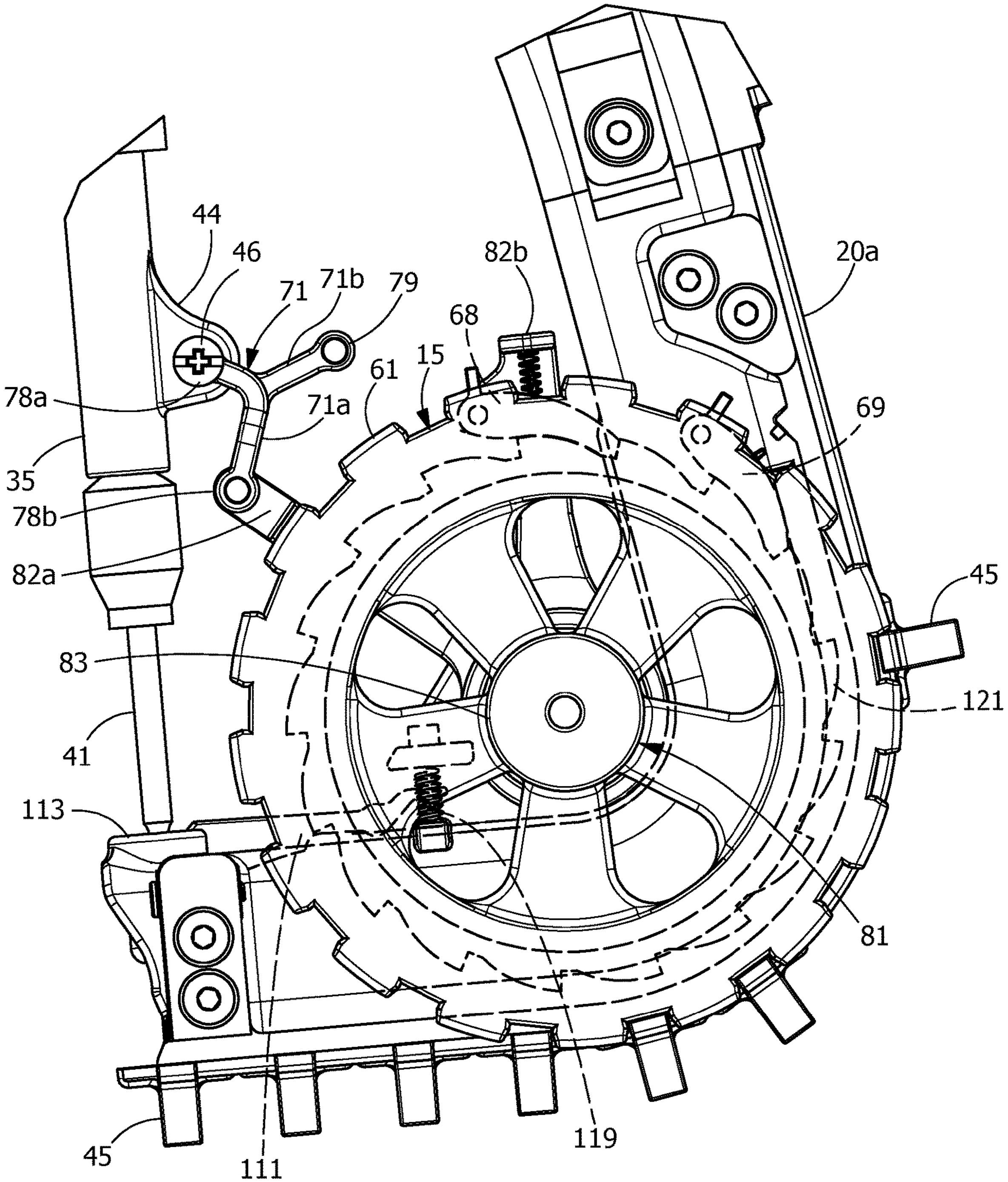
FIG. 6A is a schematic view of an advancement mechanism in a first state, according to an example embodiment of the present disclosure.

Referring to FIGS. 6A and 68, near the distal end of the drive shaft 35, the linkage mechanism 71, housed in the housing member 10, is connected to the drive shaft 35. The linkage mechanism 71. connects the drive shaft 35 and the advancement mechanism 15 located in the housing member 10 together. In one implementation, one end of the linkage mechanism 71 is attached to an extension portion 44 formed near the distal end of the drive shaft 35. The linkage mechanism 71 can be connected to the extension portion 44 with a fastener 46 (e.g., a screw). As illustrated, the linkage mechanism 71 has a first arm portion 71*a* and a second arm portion 71*b*. One end 78*a* of the first arm portion 71*a* is connected to the extension portion 44 of the drive shaft 35 and the other end 78*b* of the first arm portion 71*a* is connected to an end of the advancement carriage 81. End 79 of the second arm portion 71*b* is connected to a portion of the housing member 10. For example, end 79 of the second arm portion 71*b* is an opening that is connected to the inner surface 39 of the second housing cover 11*b* via a protrusion 99 formed on the inner surface 39 (as shown in FIG. 2). The second arm portion 71*b* can rotatably pivot about the protrusion 99. In one implementation, the linkage mechanism 71 is substantially Y-shaped.

The advancement carriage 81 includes a first connector arm 82*a* and a second connector aria 82*b* extending from a hub 83. The hub 83 forms the central part of the advancement carriage 81 that rotates about a central axis of the advancement mechanism 15. In one implementation, the first connector arm 82*a* and the second connector arm 82*b* extend from the hub 83 forming a V-like shape. The first connector arm 82*a* is configured to connect the first arm 71*a* of the linkage mechanism 71 and the hub 83. The second connector arm 82*b* is configured to connect the hub 83 and a driving pawl 68 together, of which the driving pawl 68 rotates about its axis at an end portion of the second connector arm 82*b*. Due to the connected construction of the drive shaft 35 and the advancement carriage 81 via the linkage mechanism 71, the rate and/or speed of movement of the drive shaft 35 and the advancement carriage 81 will be the same.

Figure 6B:
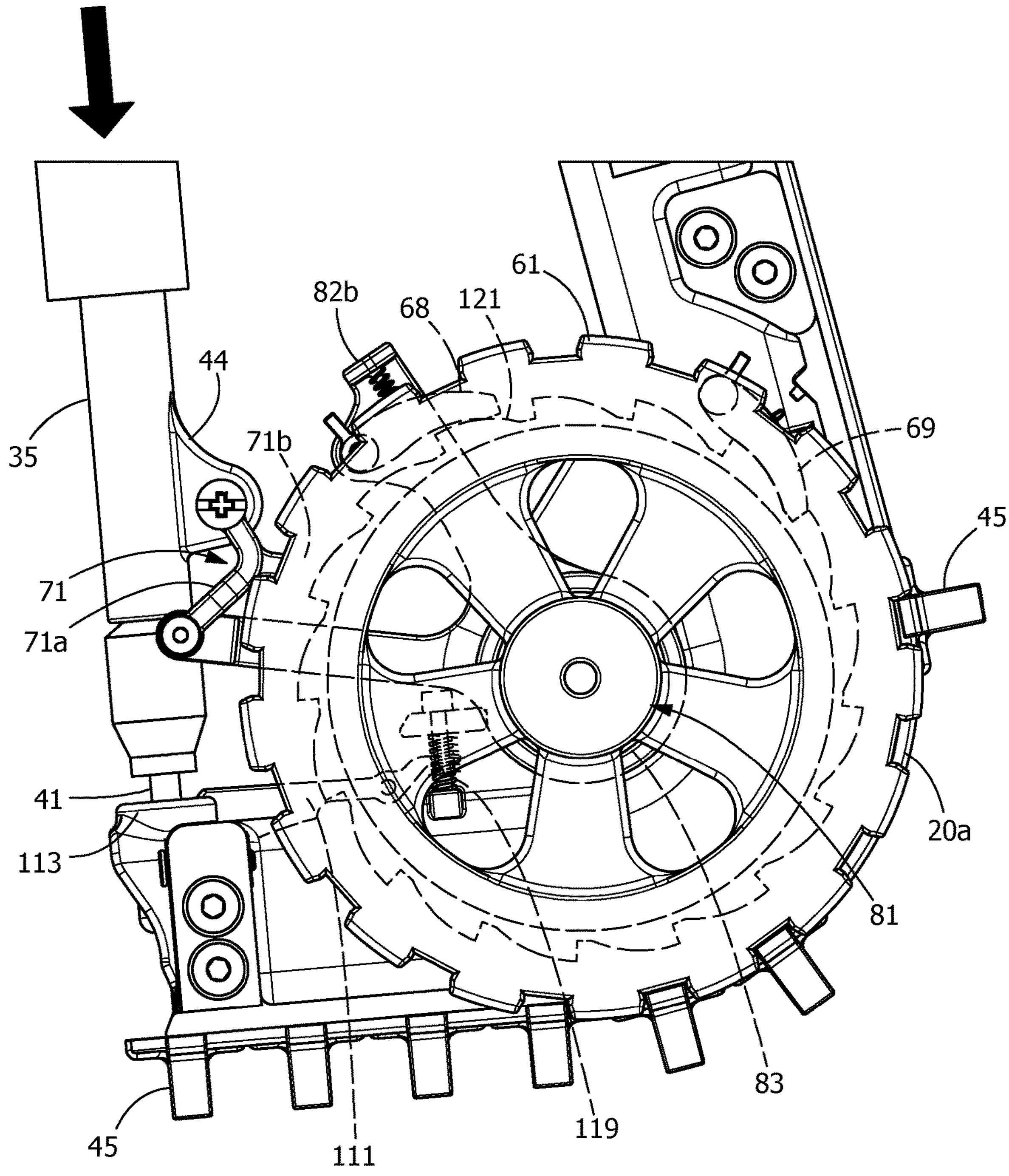
FIG. 6B is a schematic view of an advancement mechanism in a second state, according to an example embodiment of the present disclosure.

In operation, as shown in FIG. 6B, as the drive shaft 35 moves toward the screw 41, caused by the clockwise direction of the power tool, the vertical movement of the drive shaft 35 influences rotation of the advancement mechanism 15, more specifically, the advancement carriage 81 via the linkage mechanism 71. In other words, as the drive shaft 35 descends, the attached first arm portion 71*a* of the linkage mechanism 71 moves, causing the first connector arm 82*a* of the advancement carriage 81 to correspondingly rotate. To describe in a different manner, the linkage mechanism 71 provides an oscillatory motion that is translated into a rotary motion of the advancement carriage 81. Further, due to the first connector arm 82*a* being attached to the linkage mechanism 71, this causes the advancement carriage 81 to rotate counter-clockwise relative to the wheel 61. in turn allows the driving pawl 68 to be seated -within a tooth 121 of the wheel 61 without locking. In other words, the driving pawl 68 does no work when the hub 83 of the advancement carriage 81 rotates in the counter-clockwise direction. Then as the drive shaft 35 retreats (raises) after the screw 41 has been fastened to the joist, the first arm portion 71*a* of the linkage member 71 moves -upwardly, causing the first connector arm 82*a* of the advancement carriage 81 to rotate in an opposite direction (i.e., clockwise direction), The clockwise movement of the first connector arm 82*a* pushes the driving pawl 68 against one of the teeth 121 of the wheel 61, forcing the wheel 61 to rotate in clockwise direction. This in turn then actuates the wheel 61 to engage with the connector clips 45 and pushes the next connector clip 45 forward into place in the installation site. A locking pawl 69 prevents the wheel 61 from reversing direction while the driving pawl 68 returns. So, rotation is allowed in only one direction (i.e., clockwise direction).

Figure 7:
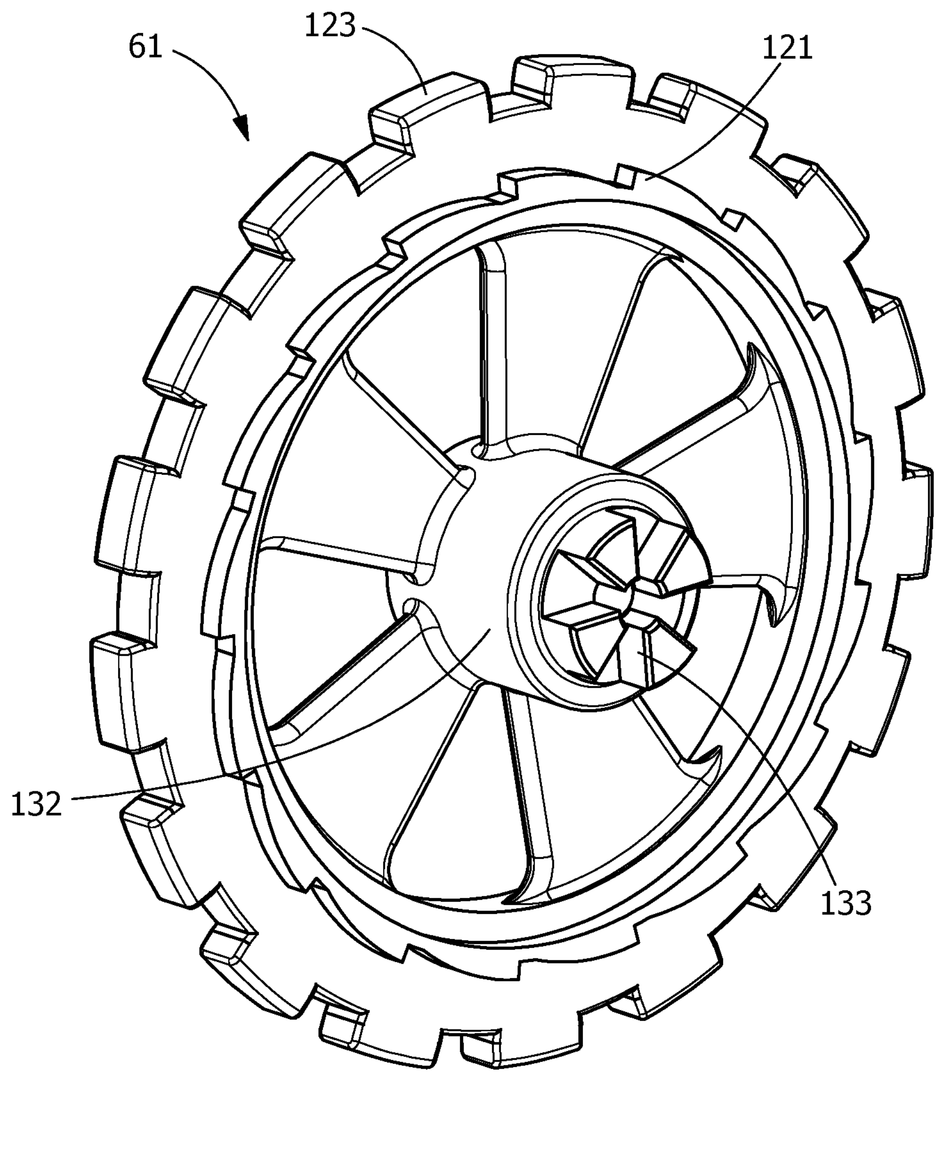
FIG. 7 is a schematic view of a wheel of an advancement mechanism, according to an example embodiment of the present disclosure.

FIG. 7 is a schematic view of the wheel 61, according to an example embodiment. The wheel 61 includes a plurality of inner set of teeth 121 and a plurality of outer set of teeth 123. As earlier discussed, the driving pawl 68 can engage with one of plurality of teeth 121 for rotating the wheel 61 in a clockwise direction. The outer plurality of teeth 123 are configured to engage with the connector clips 45 and move the connector clips 45 forward into place in the housing member 10. In one implementation, the outer plurality of teeth 123 has a shape to correspondingly engage with a shoulder portion 127 (as shown in FIG. 11A) of the connector clip 45. The wheel 61 further includes a central shaft 132 where the hub 83 of the advancement carriage 81 engages on an outer surface of the central shaft 132. The central shaft 132 includes a plurality of raised portions 133 such that seating pedal member 40 attaches to the housing member 10. The plurality of raised portions 133 ensures securement of the seating pedal member 40 against the housing member 10 from external movement.

Figure 8:
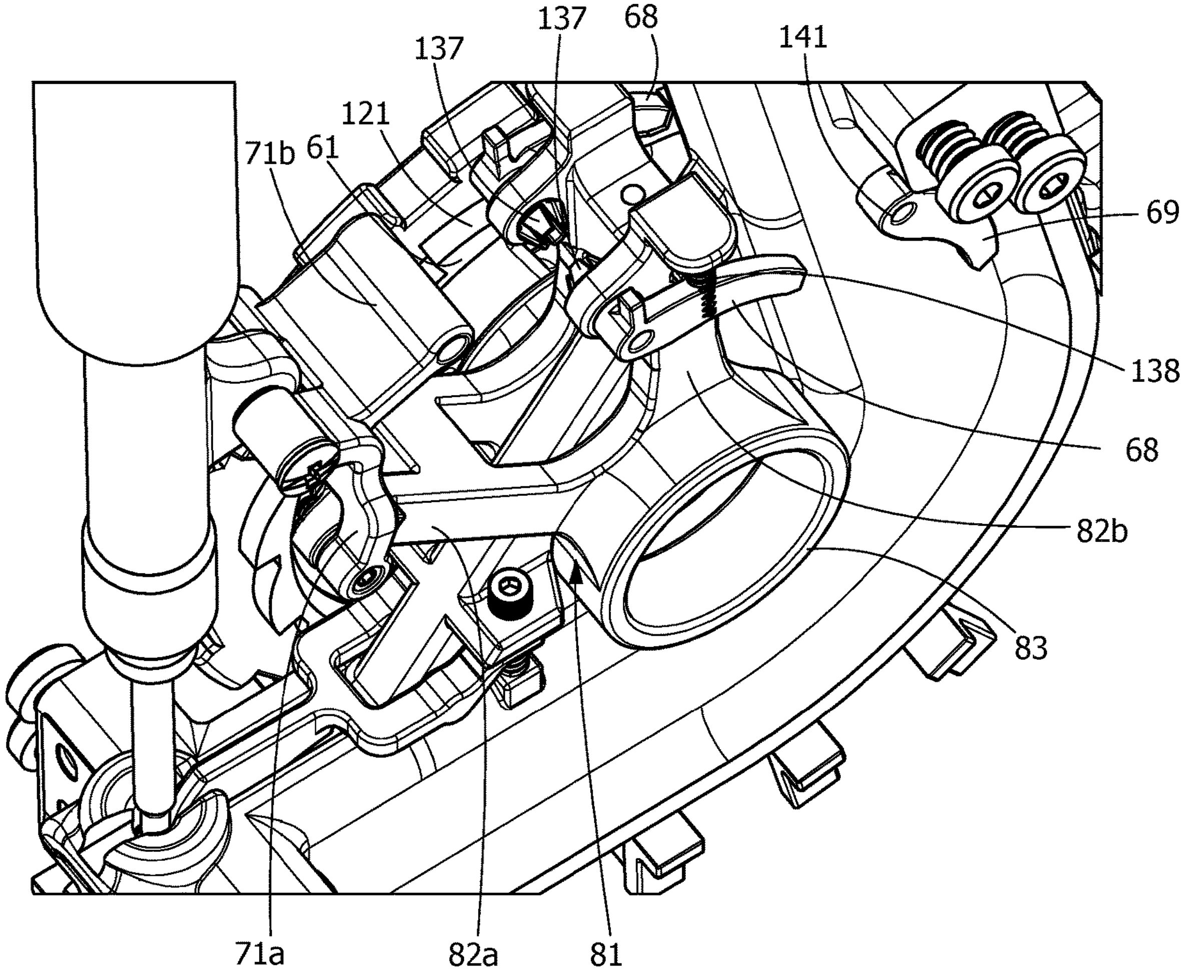
FIG. 8 is a partial schematic view of an advancement mechanism, according to an example embodiment of the present disclosure.

FIG. 8 is a schematic view of a portion of the advancement carriage 81, according to an example embodiment. Similar elements as discussed earlier will not be discussed herein in this section. As shown in FIG. 8, the advancement carriage 81 includes a pair of (driving) pawls 68*a*, 68*b* that engages the plurality of teeth 121 of the Wheel 61. More specifically, pawl 68*a* rests and engages with the plurality of teeth 121 for rotation of the wheel 61. Each pawl 68*a*, 68*b* is attached near an end of the respective second connector arms 82*a* of the advancement mechanism 81. In one implementation, pawls 68*a*, 68*b* are attached to the respective second connector arms 82*a* via a fastener 137 (e.g., bolt) that can rotate about its axis. In order to provide a retention force, a retention member 138 (e.g., spring) is attached to the pawls 68*a*, 68*b* to bias the pawls 68*a*, 68*b* against the wheel 61. in one implementation, the retention member 138 is located between each pawl 68*a*, 68*b* and a portion near a top portion of the second connector arms 82*a*. In addition to pawls 68*a*, 68*b* engaging with wheel 61, pawl 69 also engages with the wheel 61 to ensure a one-way direction (i.e., clockwise). Pawl 69 is attached to the inner fastener member 20*a* at a fixed point 141 which freely rotates about its axis.

Referring back to FIG. 1, the drive shaft housing member 30 and the fastener track member 20 are externally connected together, via a connector 92, for structural integrity. In some implementations, the connector 92 is attached on the first portion 22 of the fastener track member 20. In this implementation, there are two connectors 92 used for connecting the drive shaft housing member 30 to the fastener track member 20. It should be appreciated that more or less connectors 92 can be employed to secure the drive shaft housing member 30 and the fastener track member 20 together. In some implementations, the connector 92 can be attached on the second portion 24 of the fastener track member 20. As shown in FIG. 5A, the connector 92 includes a first portion 93 and a second portion 96. The first portion 93 has a shape that corresponds to a shape of the drive shaft housing member 30 and the second portion 96 has a shape that corresponds to a shape of the fastener track member 20, more specifically, the shape of the first track portion 52 of the fastener track member 20. For example, the first portion 93 can have a circular hollow shape to engage the drive shaft housing member 30 and the second portion 96 can have a substantially rectangular hollow shape to engage the first track portion 52 of the fastener track member 20. At an end of the second portion 96, an inward portion (not shown) is formed to secure the second portion 96 against the fastener track member 20. The inward portion can abut against a protruding member formed on a surface of the fastener track member 20 and configured to act as a clip to securely hold the second portion 96 against the fastener track member 20. Alternatively, the inward portion can be inserted into an opening (or slot) formed in the fastener track member 20. In one implementation, the connector 92 can be constructed with the same material as the fastener track member 20 and/or the drive shaft housing member 30. For example, the connector 92 can be made from plastic. In other implementations, the connector 92 can be constructed with a different material as the fastener track member 20 and/or the drive shaft housing member 30 such as, for example, metal. The connector 92 is constructed to yield a stronger strength for deformation.

Figure 9:
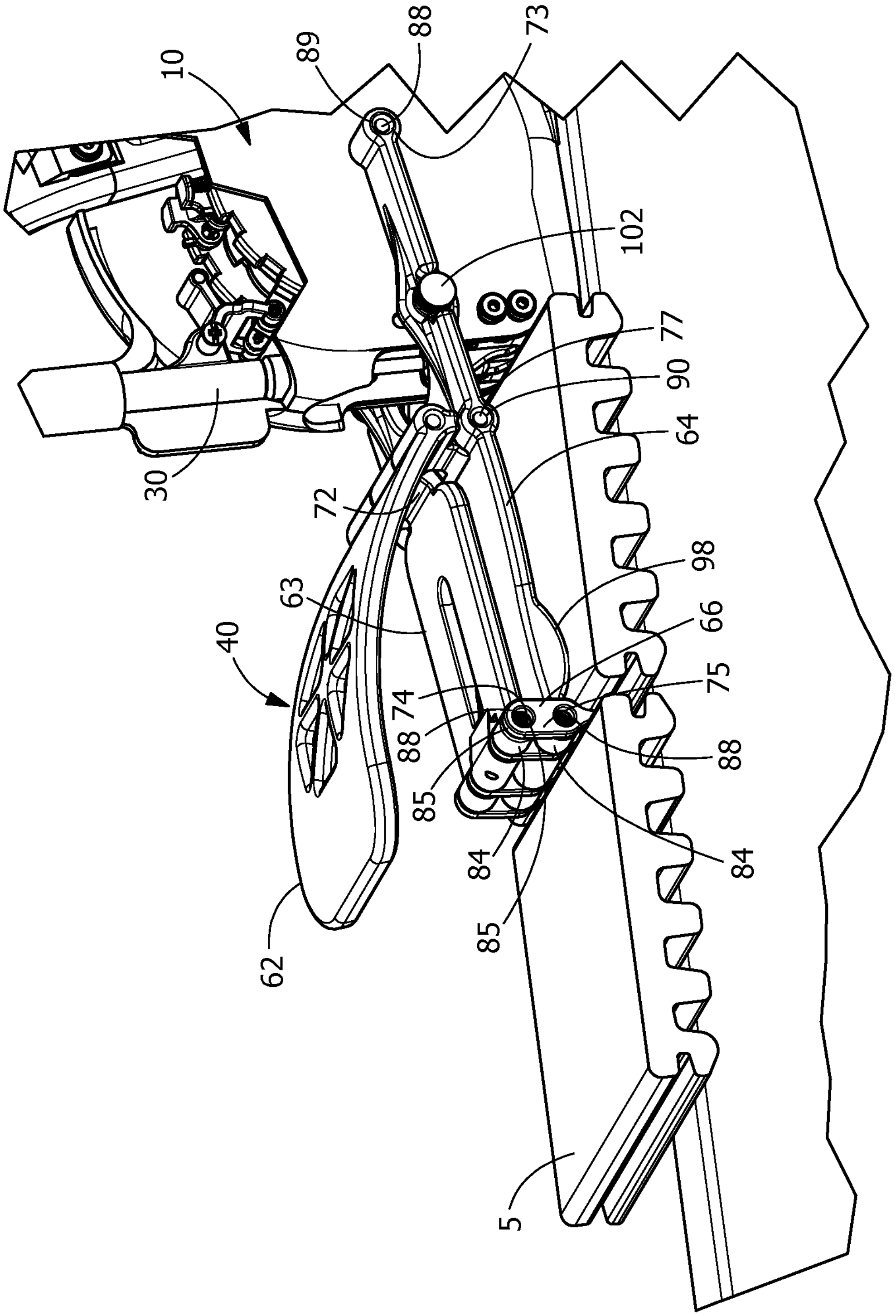
FIG. 9 is a schematic view of a seating pedal member, according to an alternative example embodiment of the present disclosure.

Referring to FIG. 9, the seating pedal portion 40 includes a pedal 62 configured to receive a user's foot, a first linkage member 63, a second linkage member 64, and an arm 66 including a tip 67 for engaging the connector clip 45. The first linkage member 63 is positioned between the pedal 62 and the second linkage member 64. The first linkage member 63 includes a first end 72 and a second end 74 opposite the first end 72, in which the first end 72 is connected to the pedal 62 and the second end 74 is connected to the arm 66. The second linkage member 64 includes a first end 73 and a second end 75 opposite the first end 73, in which the first end 73 is connected to the housing member 10 and the second end 75 is connected to the arm 66. The second ends 74, 75 are configured to axially rotate with respect to the arm 66. This in turn permits the arm 66 to translationally move (i.e., side-to-side) and causes the installation tool 1 to move towards a side portion of the board 5. In one implementation, each of the second ends 74, 75 includes a hollow bore 84 which is co-axially aligned to a hollow bore 85 formed in the arm 66. The hollow bore 84 and the hollow bore 85 are held together by a pin 88 inserted into the respective bores 84, 85. In further implementation, the first linkage member 63 includes a pair of hollow bores 84 formed at the second end 74, and the second linkage member 64 includes a pair of hollow bores 85 formed at the second end 75, creating a four-bore configuration, as shown in FIG. 9. The first end 73 of the second linkage member 64 is co-axially connected to the advancing mechanism 15, more specifically, the wheel 61 housed in the housing member 10. The first end 73 similarly includes the hollow bore 88 which is co-axially aligned with the wheel 61, and held together by a pin 89 inserted into the hollow bore 88 and a central bore of the wheel 61. The pin 89 can extend from a first side portion to a second side portion of the housing member 10 (more specifically, housing covers 11*a*, 11*b*), and configured to hold the second linkage member 64 against the housing covers 11*a*, 11*b*. To describe in a different manner, the pin 89 extends entirely through the housing covers 11*a*, 11*b* in a width direction of the housing member 10. The second linkage member 64 further includes a hollow bore 77 to engage with the pedal 62. In one implementation, the hollow bore 77 is in a middle portion of the second linkage member 64 adjacent to pedal 62. The hollow bore 77 acts as a fulcrum to help stabilize the seating pedal member 40 and/or reduce the load on the second linkage member 64. A pin 90 is inserted into the hollow bore 77 to rotate about its axis. In order to further secure the second linkage member 64 to the housing member 10, a fastener 102 (e.g., a bolt) is fastened to the housing covers 11*a*, 11*b* of the housing member 10. This reduces stress and load applied on the second linkage member 64.

Near the second end 74 of the second linkage member 64 includes a protruding member 98 on a bottom surface (i.e., surface contacting the board 5) of the second linkage member 64. When the pedal 62 is depressed, the protruding member 98 provides a slight upward force to the seating pedal member 40 and brings the boards 5 together. That is, the protruding member 98 facilitates with the movement of the arm 66 and/or acts as a leverage to ensure the installation tool 1 is pushed against the to-be installed board 5 and/or ensure that the to-be installed board 5 engages the connector clip 45. Together with the protruding member 98, a bottom surface 105 of the housing member 10 can be slightly curved to assist with the upward force needed for operating the seating pedal member 40.

Figure 10A:
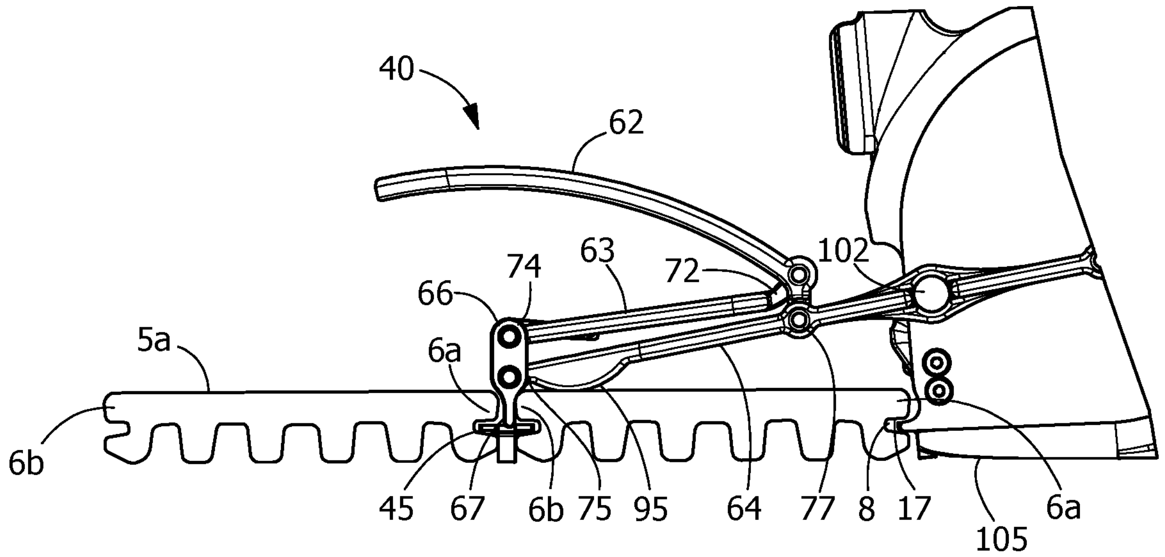
FIG. 10A is a side view of a seating pedal member in an initial state, according to an example embodiment of the present disclosure.
Figure 10B:
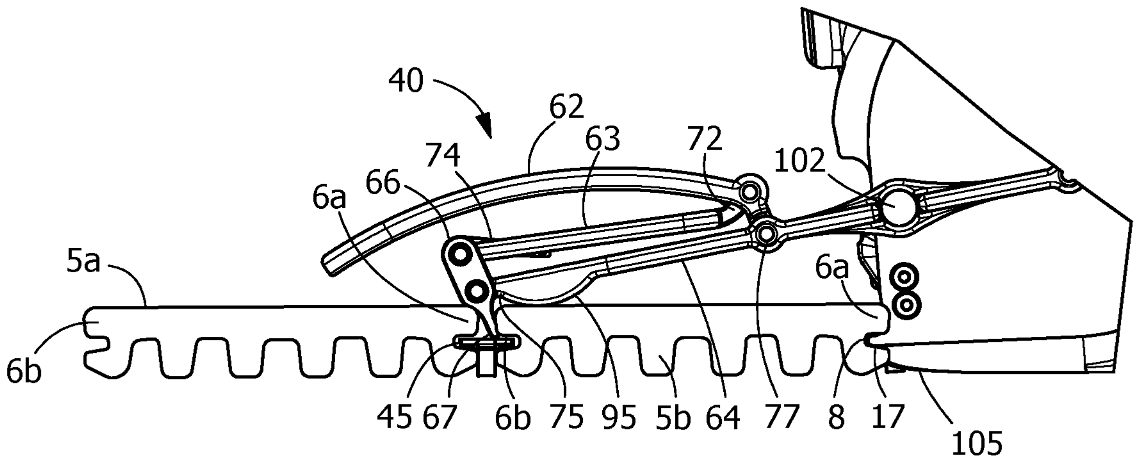
FIG. 10B is a side view of a seating pedal member in a depressed state, according to an example embodiment of the present disclosure.

FIGS. 10A and 10B illustrate an operation of the seating pedal member 40 according to an example embodiment. For simplicity sake, the user's foot are not shown in the figures. FIG. 10A illustrates the seating pedal member 40 in a first (ready) position, prior to the user's foot operating the pedal 62. FIG. 10B illustrates the seating pedal member 40 in a second position, with the user's foot depressing the pedal 62. The pedal 62 is configured to be moveable from the first position to the second position. For illustrative purpose, as shown in FIGS. 10A and 10B, board 5*a* is a previously installed board and board 5*b* is a to-be installed board. Each board 5*a*, 5*b* has a first end 6*a* and a second end 6*b*. Each of the first end 6*a* and the second end 6*b* has a slot 8 cut along a longitudinal direction of boards 5*a*, 5*b*. The slot 8 permits a portion of the connector clip 45 to engage the board 5*a*, 5*b* and fasten against the board 5*a*, 5*b* while hiding the connector clip 45 from plain sight. The slot 8 is also designed to permit an edge of the installation tool 1 to engage (i.e., abut into) while operating to bring the boards 5*a*, 5*b* together. It should be appreciated that the slots 8 are preformed prior to the boards 5*a*, 5*b* being installed.

In the first position, the tip 67 of the arm 66 can abut against a side portion of the board 5*a*. To describe differently, between boards 5*a*, 5*b*. In other implementations, the tip 67 can be above the connector clip 45. As the seating pedal member 40 transitions from the first position to the second position, the arm 66 moves, which in turn moves the tip 67. Due to the linkage configuration of the first linkage member 63 and the second linkage member 64, the tip 67 can move (e.g., pivot) about an axis of the connector dip 45. As compared to FIG. 10A, the tip 67 in FIG. 10B has moved to the right. This causes the seating pedal member 40 to draw (i.e., pull) the installation tool 1 toward the board (e.g., board 5*b*) being installed, and the installation tool 1 in turn pushes the board 5*b* against the previously installed connector dip 45 and board 5*a*. In other words, an edge 17 of the installation tool 1 moves toward the slot 8 located at first end 6*a* of board 5*b*, comes into abutment inside the slot 8, and pushes board 5*b* towards board 5*a* for a tight arrangement of deck assembly. Accordingly, the seating pedal member 40 may obtain substantial leverage from the direct board in contact as well as the adjacent (previously fastened) course of board 5. This also enables the seating pedal member 40, in another ideal arrangement, to be extended in length to engage with the far edge of the board 5 (FIG. 9) to draw the fastener 45 and current course of boards together, forming a tighter arrangement with the prior course of boards.

In addition, a feature of the seating pedal member 40 enables a single operator to use the installation tool in a standing upright position, while applying the connector clips 45. This in turn saves installation time and/or avoids fastening the connector clips 45 in close proximity, causing possible injuries to the operator.

In some implementation, an anti-slip material may be formed on a surface of the pedal 62. The anti-slip material can be made from, for example, a layer of plastic, fabric, and/or rubber materials.

Figure 11B:
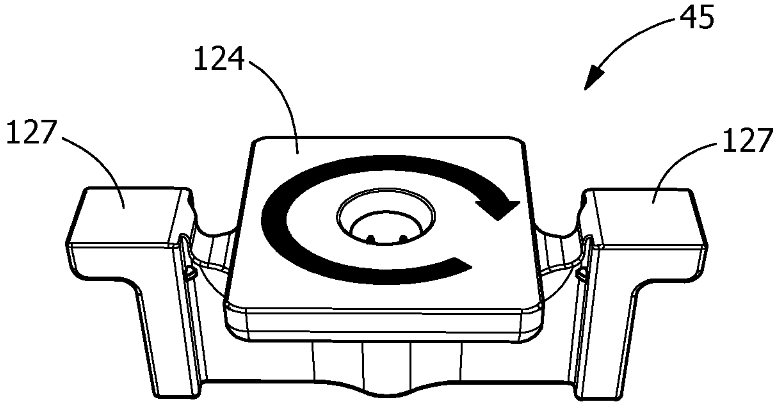
FIGS. 11B-11D are schematic views of a connector clip illustrating various constrain movements, according to an example embodiment of the present disclosure.
Figure 11C:
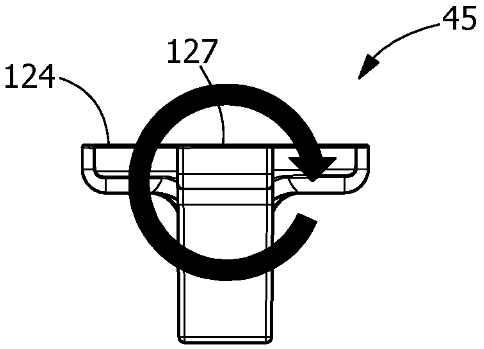
Figure 11D:
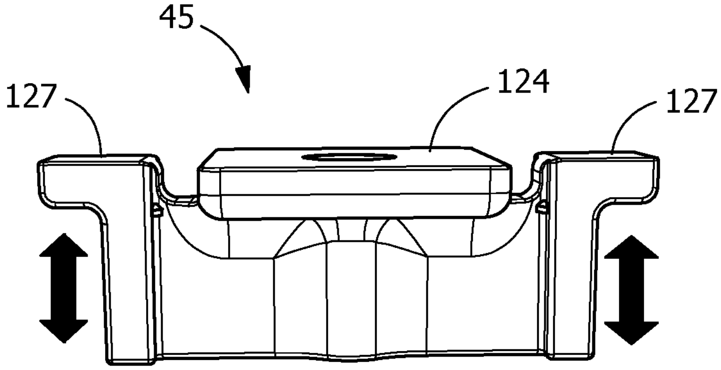

FIG. 11A illustrates a schematic view of one connector clip 45, according to an example embodiment. The connector dip 45 includes a head portion 124 and a pair of shoulder portions 127. The head portion 124 includes the opening 91 that is configured to permit the screw 41 to be screwed into a joist, for example. The opening 91 can also be configured to receive the tip 67 of the arm 66 during the operation when the screw 41 is completely fastened to the joist, creating a spacing to receive the tip 67. In other words, when the screw 41 is completely fastened to the joist, a small space is created within the opening 91 to permit the tip 67 of the rotation arm 66 to be inserted therein. In one implementation, a shape of the head portion 124 is substantially square that is designed to fit between the pair of guide rails 27. Because the head portion 124 is fitted between the guide rails 27, this prevents movements in the fastener track member 20. For example, as shown in FIG. 11B, the head portion 124 constrains torsional (defined by arrow A) (e.g., twisting, turning) movement by the connector clip 45. Additionally, the connector clip 45 includes grooves 47 that are cooperatively engageable with the guide rails 27 to ensure proper alignment. The shoulder portion 127 is formed at each side portions of the head portion 124, and configured to be cooperatively engaged in the pair of grooves 47 formed in the fastener track member 20. Similarly, the shoulder portion 127 also acts to constrain the connector clip 45 from moving within the fastener track member 20. For example, as shown in FIG. 11C, the shoulder portion 127 constrains rotational movement (defined by arrow B) by the connector dip 45; and as shown in FIG. 11D, the shoulder portion 127 constrains vertical movement (defined by arrow C) by the connector dip 45.

A size (dimension) of the shoulder portion 127 corresponds to the tooth 123 formed on the wheel 61. In other words, the shoulder portion 127 engages one of the plurality of teeth 123 for advancing each connector clip 45 into position for fastening. As the connector clip 45 enters the housing member 10 from the fastener track member 20, the advancing mechanism 15, more specifically, one tooth 123 of wheel 61 engages the shoulder portion 127 and advances the connector clip 45 along a path in the housing member 10 to a position to be fastened. This operation is repeated as the wheel 61 rotates (i.e., clockwise) and engages the next connector clip 45. That is, the advancement mechanism 15 of the installation tool 1 rotates the wheel 61 to sequentially advance the connector clips 45 forward for installation.

The connector dip 45 can be made from a plastic material, such as, but not limited to, polyethylene and/or glass filled nylon. Other materials, such as metal, can be employed. The connector clip 45 can be formed of any colors, such as, black, grey, brown, white, etc., in addition, to matching the color of the boards 5.

Figure 12:
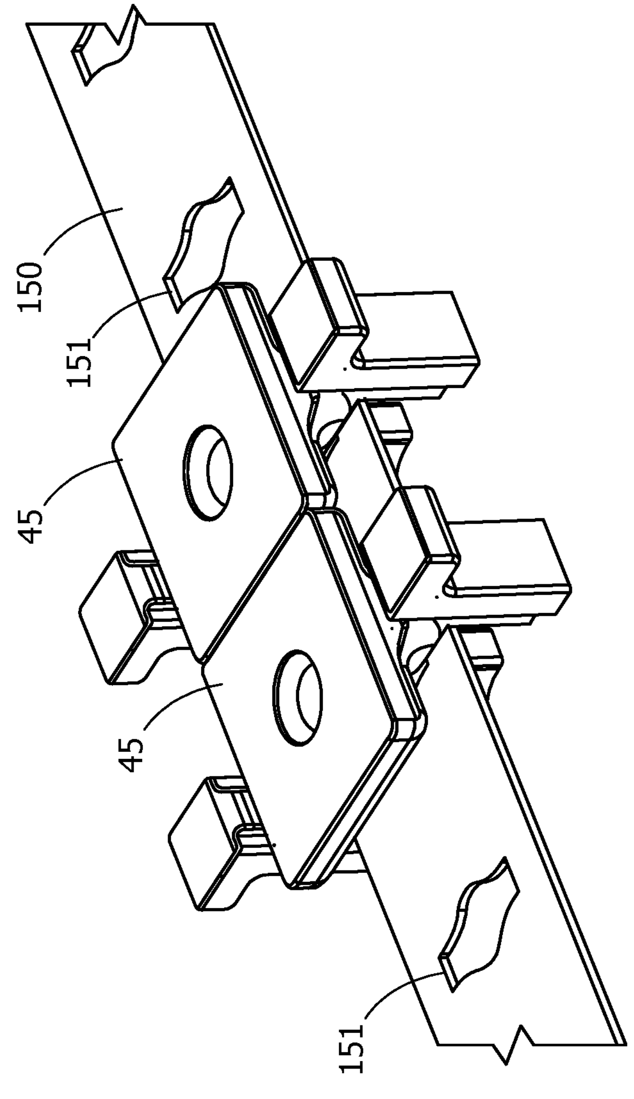
FIG. 12 is a schematic view of a strip of collated connector clips, according to an example embodiment.

Referring to FIG. 12, in some implementations, the connector clips 45 can be attached to a strip 150, forming a strip of collated fasteners. The strip 150 holds the plurality of connector clips 45 together prior to inserting the connector clips 45 into the fastener track member 20 for installation. That is, the operator may remove the strip after all clips 45 are in the fastener track member or individually remove connector clips 45 from the strip 150 and insert the removed connector clip 45 into the fastener track member 20. The strip 150 can be constructed from a polymeric material, such as polypropylene, high density polyethylene, composites, and/or metal. A length of the strip can be such that a large number of connector clips 45, for example, optionally, 50, 75, 100 or more, can be held by the strip 150. The strip 150 includes an opening 151 to receive the connector dips 45 to the strip 150. A number of openings 151 corresponds to a number of connector clips 45 to be held by the strip 150.

Figure 13B:
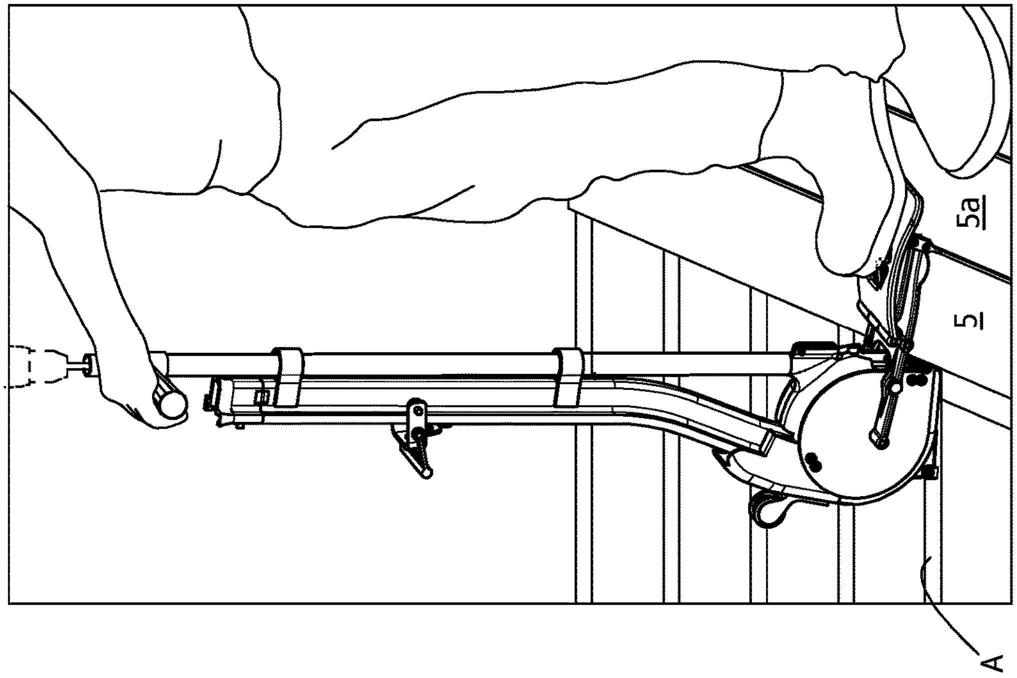
FIGS. 13A-13D are views of operating a fastener installation tool, according to an example embodiment of the present disclosure.
Figure 13A:
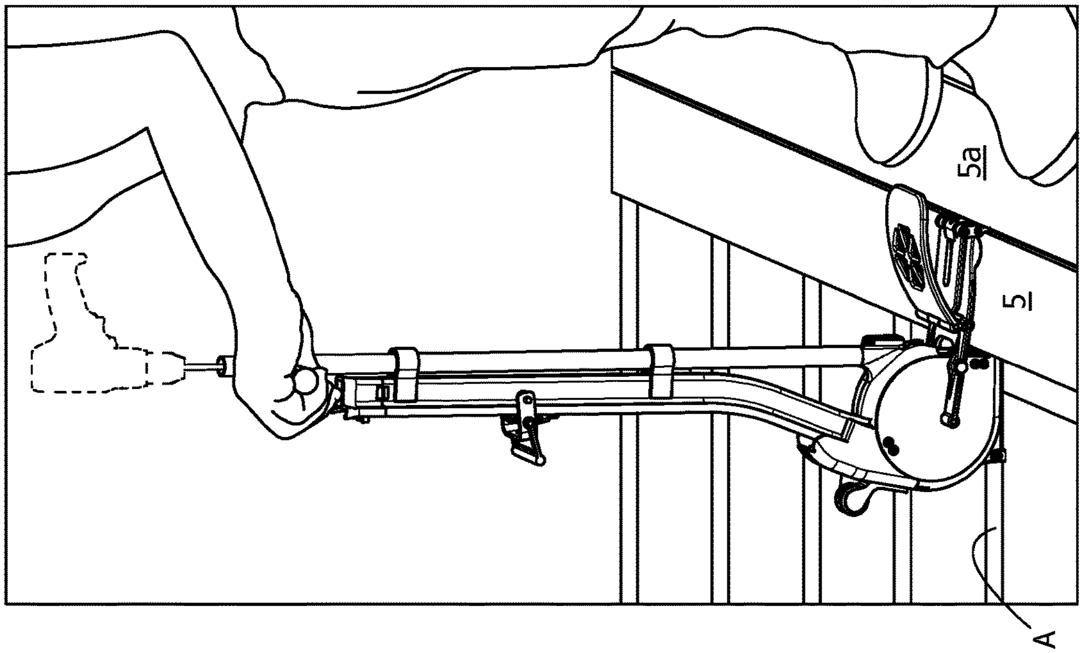

FIGS. 13A-13D illustrate a method of installing a fastener to a board, according to an example embodiment. In a first step, as shown in FIG. 13A, the operator positions the installation tool 1 for installing the connector clip 45. In this step, the tip 67 of the arm 66 of the seating pedal member 40 is positioned against a joist A for installing one connector clip 45. The operator may also use an alignment member 18 (as shown in FIG. 2) located externally on the housing member 10 for alignment of the installation tool 1. In one implementation, the alignment member 18 is located (extending) below a bottom of the housing member 10. The alignment member 18 rests against a surface of the joist running parallel in a longitudinal direction. The alignment member 18 ensures that the installation tool 1 is properly installed (i.e., centered) on the joist. This in turn facilitates that the tip 67 of the rotating member 66 properly engages the connector dip 45 that was previously installed.

Next, as shown in FIG. 13B, once the installation tool 1 is properly aligned and the tip 67 engages with a previously installed connector clip 45, the operator depresses the pedal 62 of the seating pedal member 40. As described above, the depressed pedal 62 draws the installation tool 1 toward the board 5 being installed and the installation tool 1 in turn pushes the board 5 against the previously installed board 5*a*. This ensures a tight arrangement and consistent gaps or spacing are created between the boards 5 and 5*a*. In one implementation, a spacing of ¼ inch is created between the boards 5. The operator then operates the cordless power tool (now shown) extending out of the drive shaft housing member 30 to ascend the drive shaft 35 towards the connector dip 45 for installation.

Figure 13D:
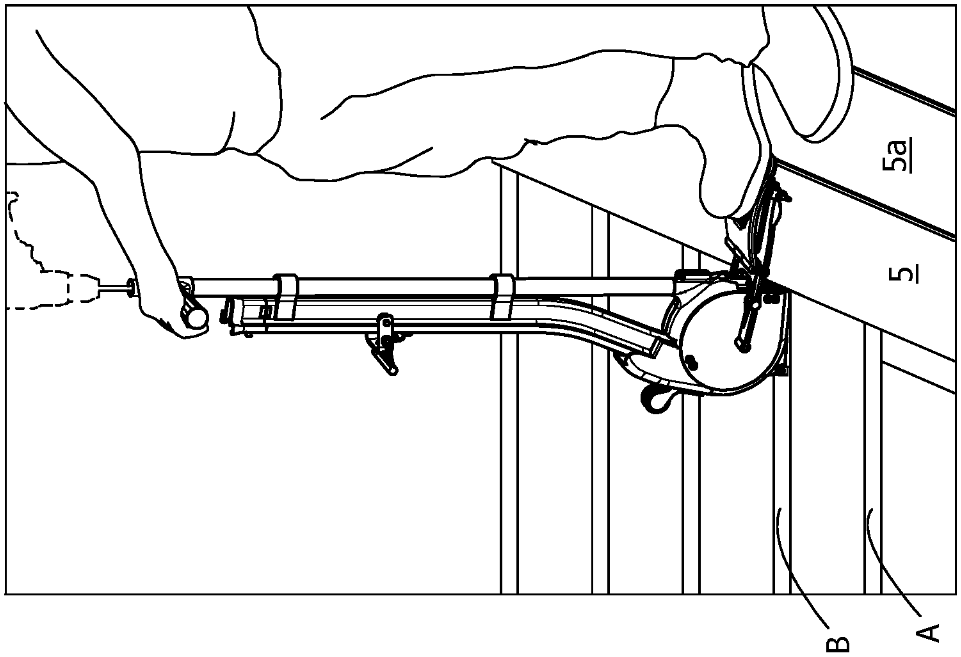
Figure 13C:
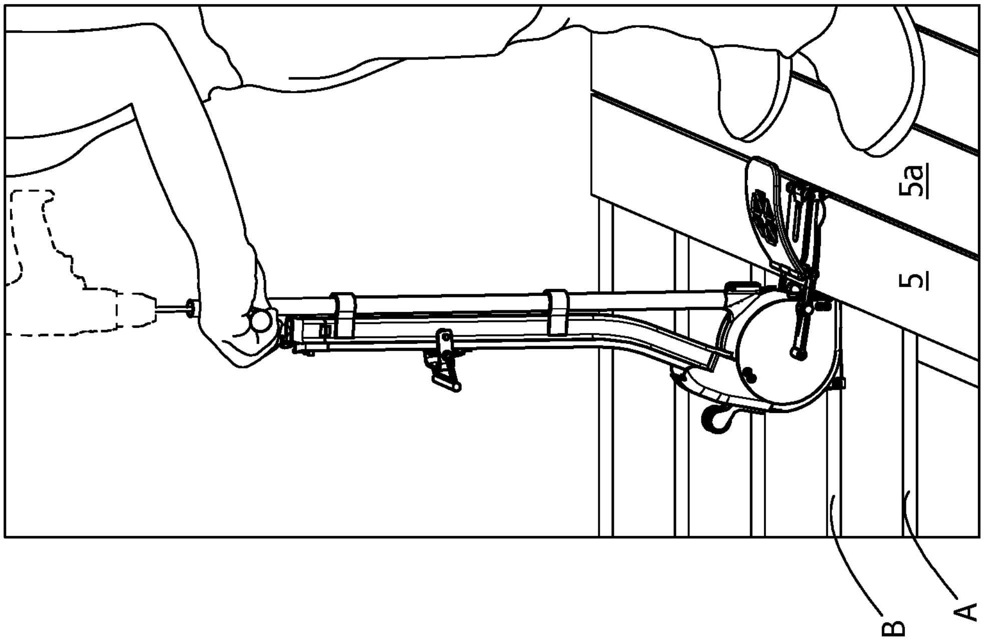

Next, once the connector dip 45 is installed, the operator removes the installation tool 1 away from the installed fastened connector clip 45 and proceeds to the next joist B for installation, of which the above steps are repeated. FIGS. 13C and 13D are identical to FIGS. 13A and 13B, respectively, except that the installation tool 1 has moved to an adjacent joist.

As described herein, the term "proximal" end relates to an end being closest to the user, and the term "distal" end relates to an end being farthest from the user.

The articles "a" and "an," as used herein, mean one or more when applied to any feature in embodiments of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

"At least one," as used herein, means one or more and thus includes individual components as well as mixtures/combinations.

The transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinarily associated with the specified material(s). The term "consisting essentially of" limits the scope of a claim to the specified elements, steps or material(s) and those that do not materially affect the basic and novel characteristic(s) of the claimed disclosure. All materials and methods described herein that embody the present disclosure can, in alternate embodiments, be more specifically defined by any of the transitional terms "comprising," "consisting essentially of," and "consisting of."

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. A connector clip for attaching a decking member to a support member, the connector clip comprising:

a base portion having a first end, a second end, a longitudinal axis that extends from the first end to the second end, a first side surface, a second side surface, a bottom end, and a top end;

a head portion attached to the top end of the base portion, the head portion comprising a first flange protruding beyond the first side surface of the base portion, a second flange protruding beyond the second side surface of the base portion, and an opening that is configured to receive a fastener for attaching the connector clip to the support member;

a first shoulder portion extending from the first end of the base portion and a second shoulder portion extending from the second end of the base portion, the first and second shoulder portions extending in opposite directions away from the head portion; and a first groove between the head portion and the first shoulder portion and a second groove between the head portion and the second shoulder portion, wherein the first and second grooves are formed into the base portion.

2. The connector clip according to claim 1 wherein each of the first and second grooves extends from the first side surface of the base portion to the second side surface of the base portion.

3. The connector clip according to claim 1 wherein the head portion has a first width measured in a direction perpendicular to the longitudinal axis and each of the first and second shoulder portions has a second width measured in the direction perpendicular to the longitudinal axis, the first width being greater than the second width.

4. The connector clip according to claim 1 wherein the first and second flanges of the head portion protrude further from the first and second side surfaces of the base portion than the first and second shoulder portions.

5. The connector clip according to claim 1 wherein the head portion has a first width measured in a direction perpendicular to the longitudinal axis and each of the first and second grooves has a groove width that is less than the first width.

6. The connector clip according to claim 1 wherein the head portion has a square shape.

7. The connector clip according to claim 1 wherein the head portion has a top surface that lies in a plane, and wherein the first and second shoulder portions each have a top surface that lies in the plane.

8. The connector clip according to claim 1 wherein the head portion has a top surface and a bottom surface, the bottom surface of each of the first and second flanges of the head portion forming a downwardly facing shoulder that faces towards the bottom end of the base portion.

9. The connector clip according to claim 1 further comprising:

the head portion comprising a top surface, a bottom surface, and an edge extending between the top and bottom surfaces, the edge comprising a first side edge and a second side edge opposite the first side edge;

the first groove is bounded by the first side edge of the head portion and a first end wall of the base portion; and the second groove is bounded by the second side edge of the head portion and a second end wall of the base portion.

10. The connector clip according to claim 1 further comprising:

the head portion having a top surface and a bottom surface; and wherein a plane that is parallel to the longitudinal axis intersects the top and bottom surfaces of the head portion without intersecting either one of the first and second shoulder portions.

11. The connector clip according to claim 1 further comprising:

each of the first and second grooves has a groove width measured in a direction perpendicular to the longitudinal axis;

wherein the head portion has a head width measured in the direction perpendicular to the longitudinal axis; and wherein the head width is greater than the groove width.

12. A connector clip for attaching a decking member to a support member, the connector clip comprising:

a base portion having a first end, a second end, a longitudinal axis that extends from the first end to the second end, a first side surface, a second side surface, a bottom end, and a top end, the base portion having a length measured in a direction of the longitudinal axis and a width measured in a direction perpendicular to the longitudinal axis, the length being greater than the width;

a head portion attached to the top end of the base portion, the head portion comprising a first flange protruding beyond the first side surface of the base portion, a second flange protruding beyond the second side surface of the base portion, and an opening that is configured to receive a fastener for attaching the connector clip to the support member;

a first shoulder portion extending from the first end of the base portion and a second shoulder portion extending from the second end of the base portion, the first and second shoulder portions extending in opposite directions away from the head portion;

a first groove between the head portion and the first shoulder portion and a second groove between the head portion and the second shoulder portion;

wherein the head portion has a first maximum width measured in the direction perpendicular to the longitudinal axis and each of the first and second shoulder portions has a second maximum width measured in the direction perpendicular to the longitudinal axis, the first maximum width being greater than the second maximum width.

13. A connector clip for attaching a decking member to a support member, the connector clip comprising:

a base portion having a first end, a second end, a longitudinal axis that extends from the first end to the second end, a first side surface, a second side surface, a bottom end, a top end, the base portion having a length measured in a direction of the longitudinal axis and a width measured in a direction perpendicular to the longitudinal axis, the length being greater than the width;

a head portion attached to the top end of the base portion, the head portion comprising a first flange protruding beyond the first side surface of the base portion, a second flange protruding beyond the second side surface of the base portion, and an opening that is configured to receive a fastener for attaching the connector clip to the support member;

a first shoulder portion extending from the first end of the base portion and a second shoulder portion extending from the second end of the base portion, the first and second shoulder portions extending in opposite directions away from the head portion; and a first groove between the head portion and the first shoulder portion and a second groove between the head portion and the second shoulder portion wherein the head portion has a first width measured in a direction perpendicular to the longitudinal axis and each of the first and second grooves has a groove width that is less than the first width.

* * * * *